United States Patent [19]

Obata

[11] Patent Number: 5,477,341
[45] Date of Patent: Dec. 19, 1995

[54] DIGITAL IMAGE FORMING APPARATUS

[75] Inventor: Masahito Obata, Tokyo, Japan

[73] Assignee: Ricoh Company, Ltd., Tokyo, Japan

[21] Appl. No.: 177,546

[22] Filed: Jan. 5, 1994

[30] Foreign Application Priority Data

Jan. 12, 1993 [JP] Japan ..................... 5-003510

[51] Int. Cl.$^6$ ..................... H04N 1/40
[52] U.S. Cl. ................. 358/448; 358/449; 358/488
[58] Field of Search ................. 358/448, 445, 358/451, 453, 467, 486, 488, 461; 382/48

[56] References Cited

U.S. PATENT DOCUMENTS

| 4,439,790 | 3/1984 | Yoshida | 358/449 |
| 4,554,592 | 11/1985 | Yoshida | 358/449 |

FOREIGN PATENT DOCUMENTS

| 0123162 | 7/1985 | Japan | 358/488 |
| 3-24861 | 2/1991 | Japan . | |

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

A digital image forming apparatus having a scanner for reading a document, a memory for storing image data generated by the scanner, and a printer for outputting the image data read out of the memory. Only the image data representative of the actual document are written to the memory so as to use the memory efficiently.

7 Claims, 25 Drawing Sheets

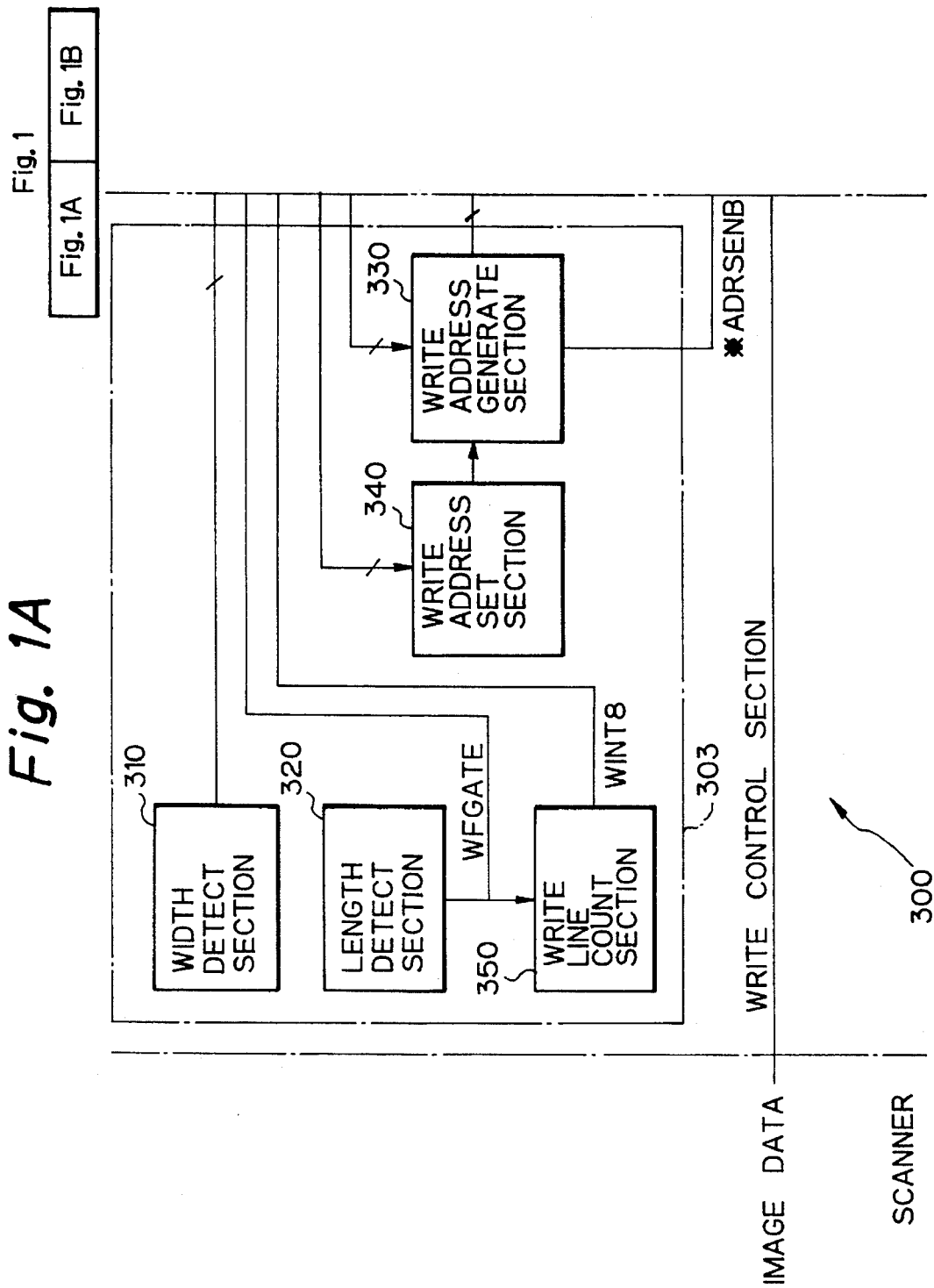

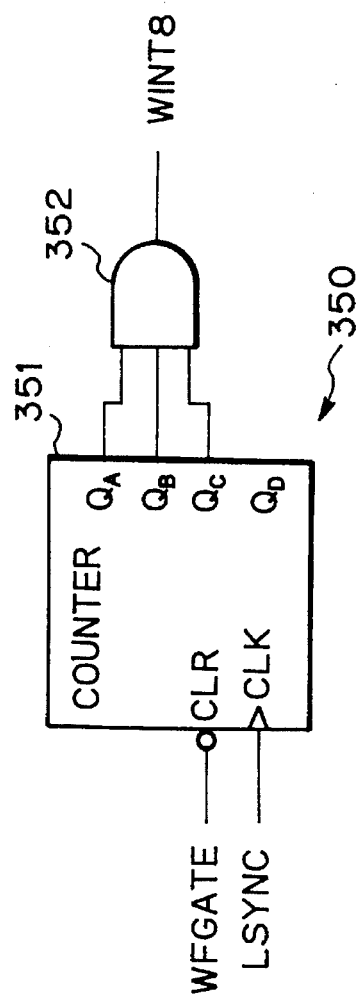
Fig. 7
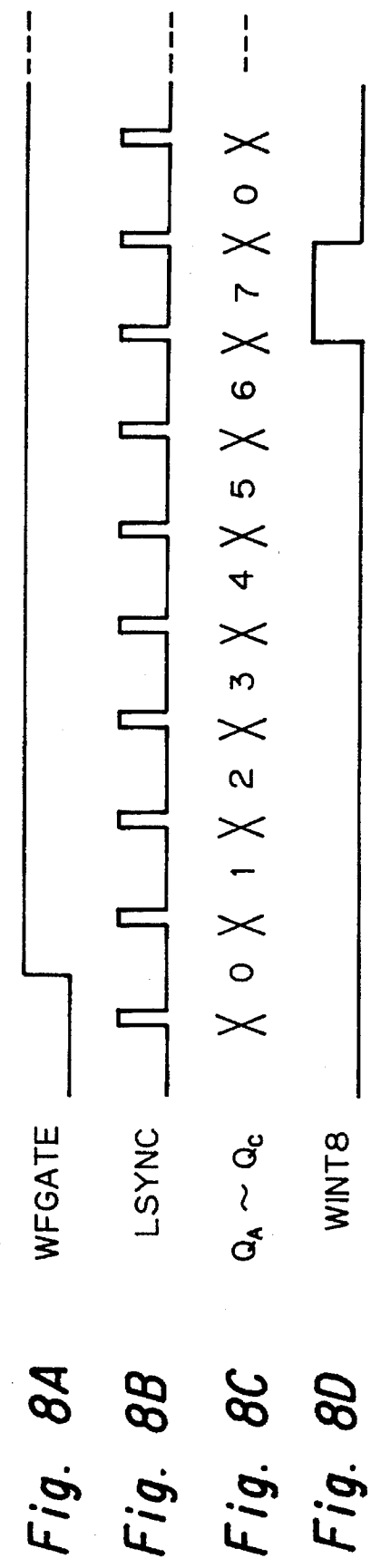
Fig. 8A  WFGATE
Fig. 8B  LSYNC
Fig. 8C  $Q_A \sim Q_C$
Fig. 8D  WINT8

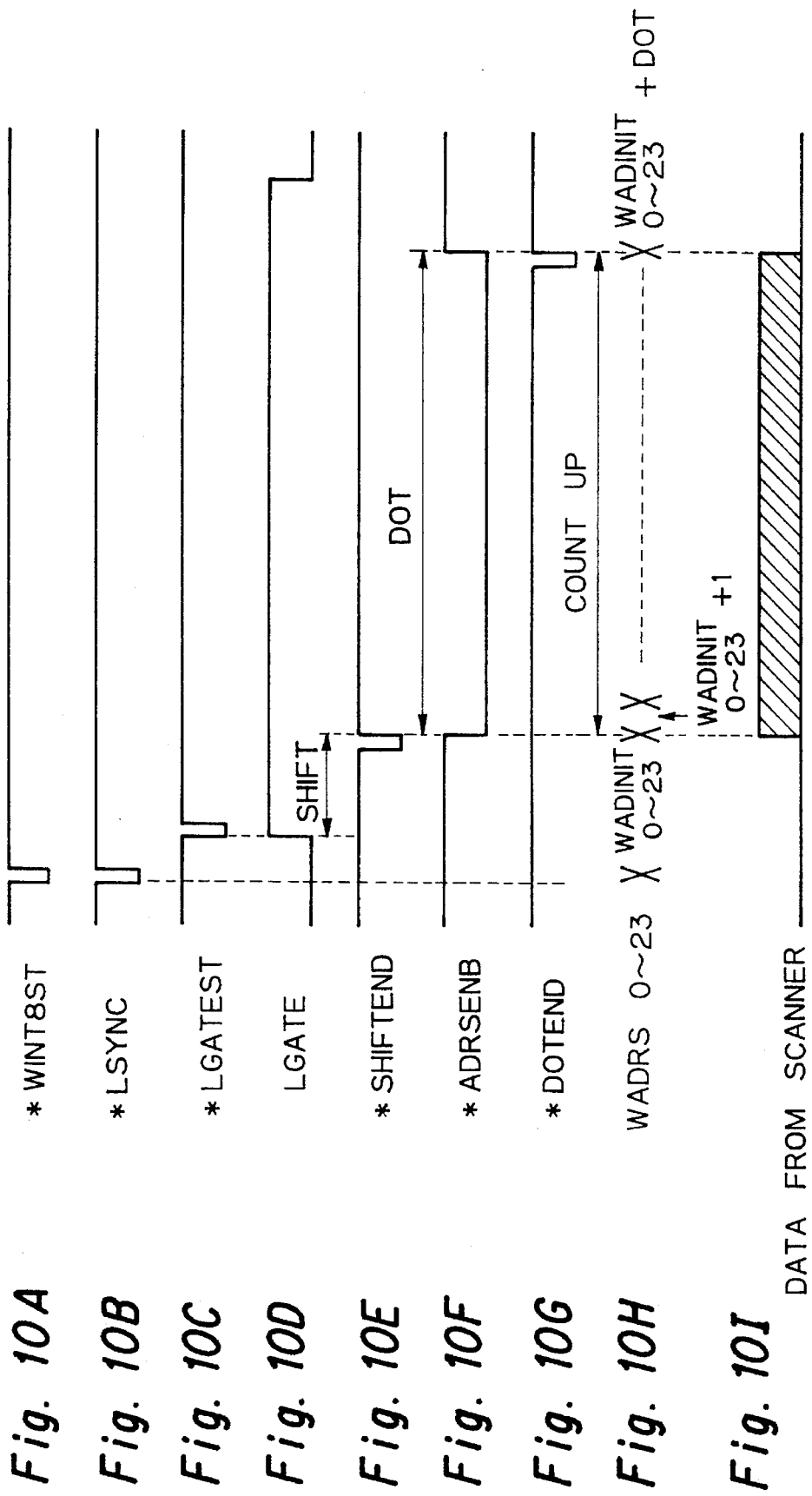

LSYNC

LGATE

RFGENB

DREQ

RFGATE

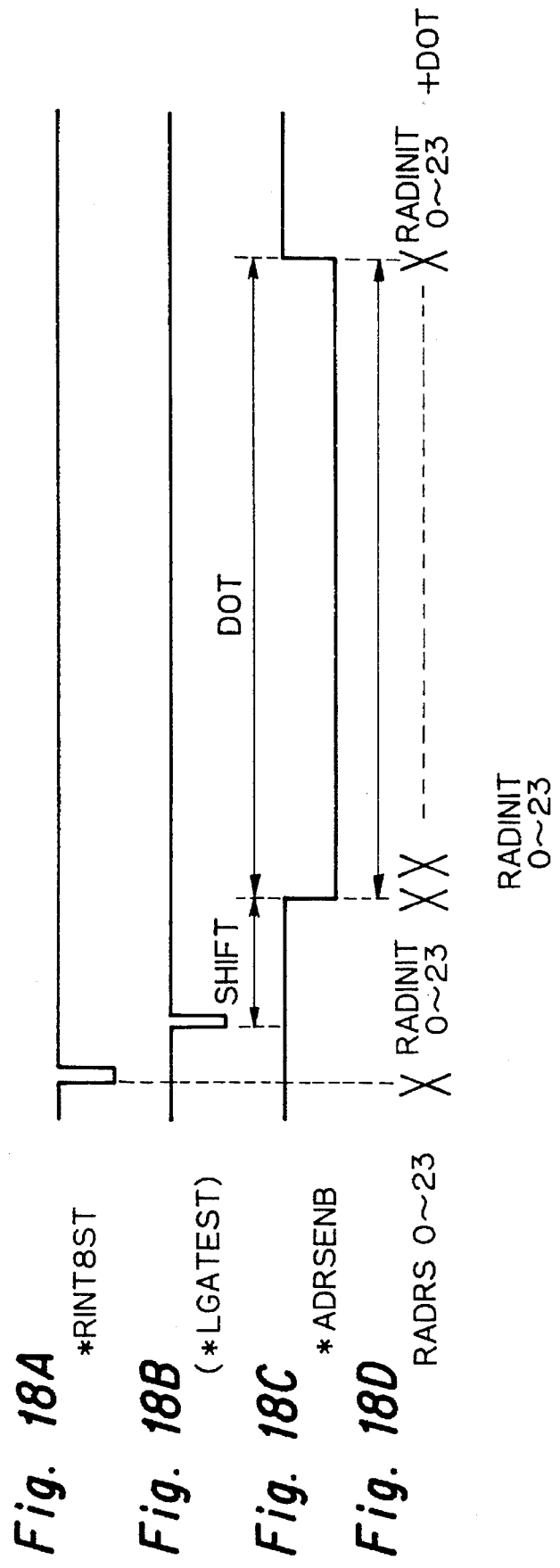

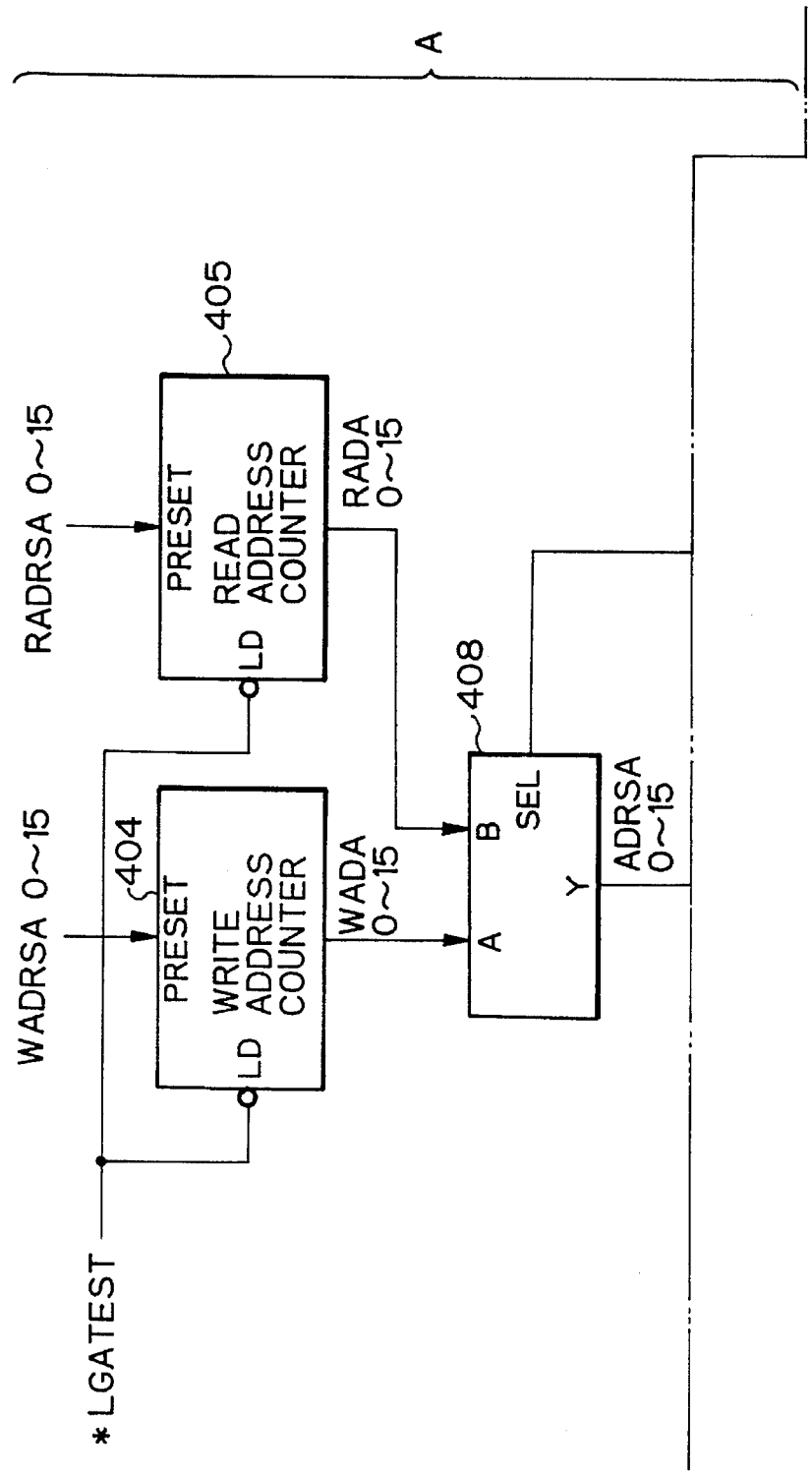

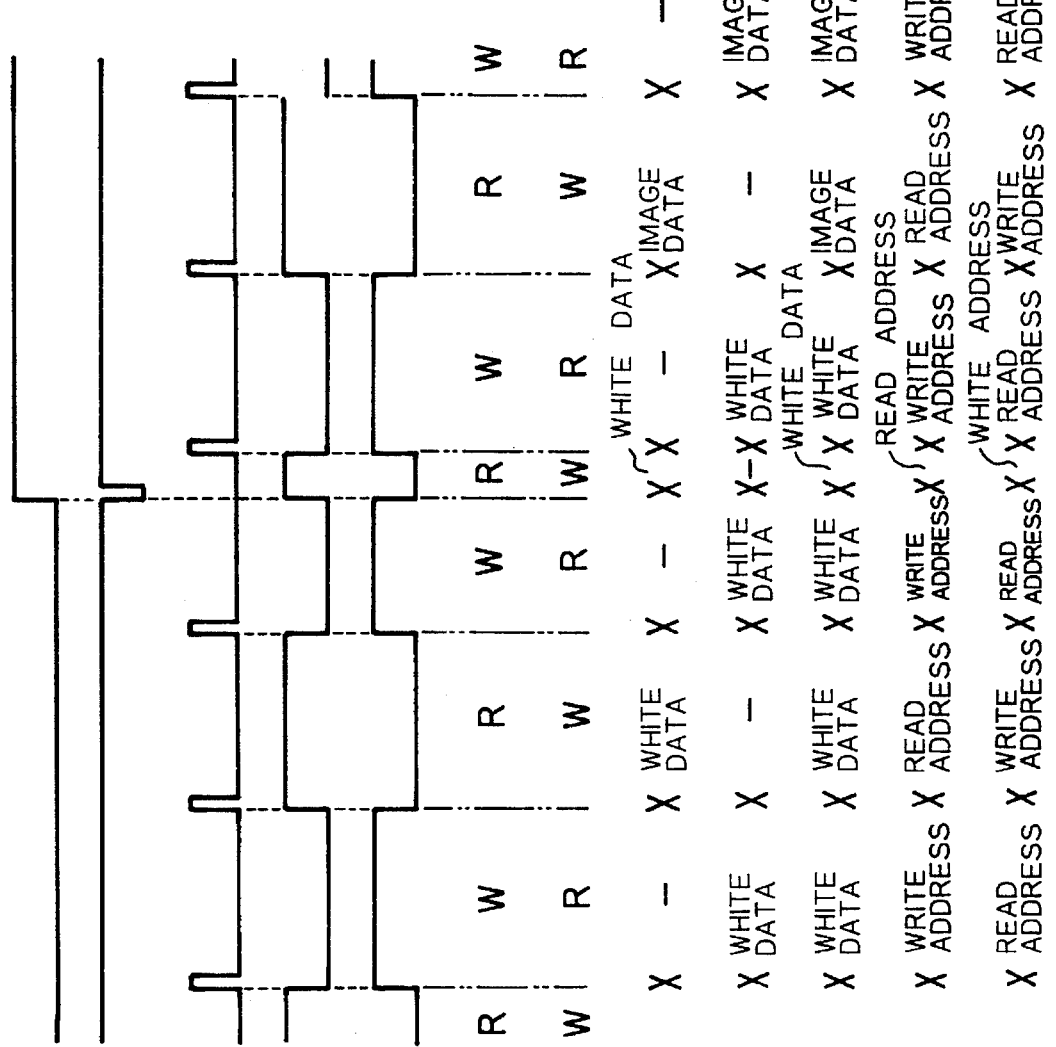

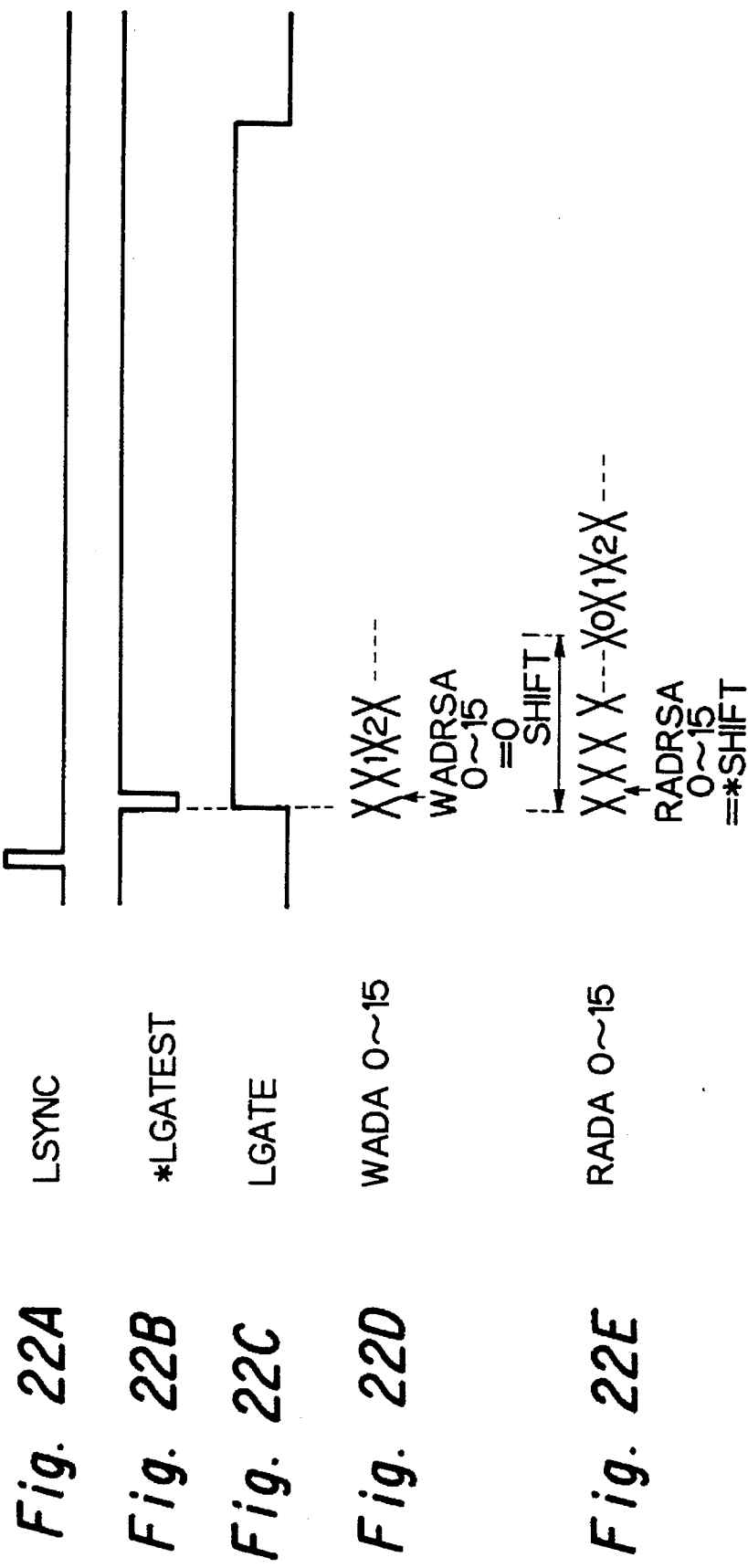

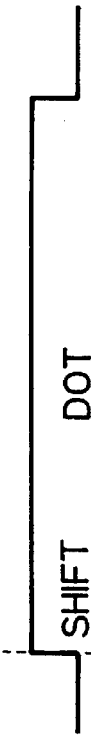
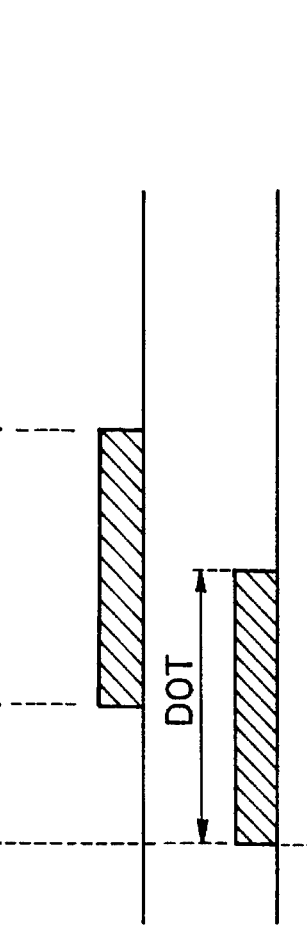
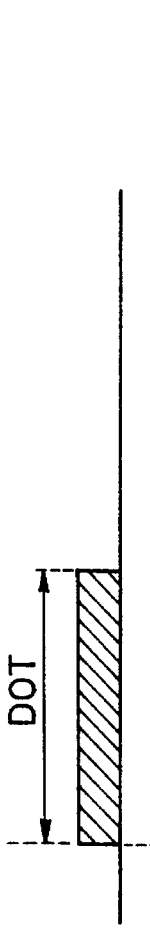
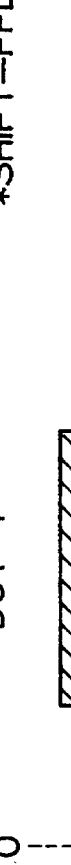
*Fig. 23A* LSYNC
*Fig. 23B* *LGATEST
*Fig. 23C* LGATE
*Fig. 23D* IMAGE DATA FROM SCANNER (WRITE DATA TO MEMORY)
*Fig. 23E* WRITE DATA TO LINE BUFFER (READ DATA FROM MEMORY)
*Fig. 23F* WRITE DATA
*Fig. 23G* READ DATA
*Fig. 23H* READ DATA FROM LINE BUFFER
*SHIFT=FFDBH

DIGITAL IMAGE FORMING APPARATUS

BACKGROUND OF THE INVENTION

The present invention relates to a digital copier or similar digital image forming apparatus of the type having a scanner for reading a document, a memory for storing image data generated by the scanner, and a printer for outputting the image data read out of the memory.

Conventional digital copiers include one having a plurality of page memories therein. In this type of copier, as a scanner reads a single document, the resulting image data are written to one or more page memories. Subsequently, the image data are read out of the page memory or memories and transferred to a printer to be printed on a paper. This allows an image to be formed a plurality of times only if the document is read once, thereby promoting a rapid copying operation. However, the problem with the copier having a page memory or page memories is that the memories cannot be used efficiently when they do not match a document in size and orientation. For example, when a copier having a page memory sized to match a document of A4 size and oriented horizontally long reads a document of A4 size and positioned vertically long, two page memories are required. Japanese Patent Publication No. 4-62223 teaches one of the conventional implementations relating to the present invention.

SUMMARY OF THE INVENTION

It is, therefore, an object of the present invention to provide a digital image forming apparatus capable of storing only the image data representative of an actual document in a memory, thereby promoting efficient use of the memory.

In accordance with the present invention, a digital image forming apparatus comprises a reading section for reading an image present on a document digitally, a storage for storing image data read by said reading means, a width detecting section for determining the width of the document in the main scanning direction, a length detecting section for determining the length of the document in the subscanning direction, a write line counting section for counting the writing lines of the storage over the length determined by the length determining section, a write address generating section for generating a write address for the storage on the basis of a count output from the write line counting section, a write address setting section for setting the initial value of the write address in the subscanning direction for the write address generating section, and a control section for calculating the initial value of the write address setting section on the basis of the width determined by the width determining section.

Also, in accordance with the present invention, a digital image forming apparatus comprises a reading section for reading an image present on a document digitally, a storage for storing image data read by the reading section, a width detecting section for determining the width of the document in the main scanning direction, a read valid signal generating section for generating a read valid signal in response to an image data request signal from an image forming section, a read line counting section for counting, while the read valid signal is valid, lines sequentially read out of the storage, a white data adding section for adding, on the basis of the count output from the read line counting section, white data to image data read out of the storage, a read address generating section for generating a read address for the storing section, a read address setting section for setting the initial value of the read address in the main scanning direction for the read address generating section, and a control section for calculating the initial value of the read address setting section on the basis of the width determined by the width detecting section.

BRIEF DESCRIPTION OF THE DRAWINGS

The above and other objects, features and advantages of the present invention will become more apparent from the following detailed description taken with the accompanying drawings in which:

FIG. 7 is a block diagram schematically showing a write line counting section included in the embodiment;

FIGS. 8(A–D) are timing charts indicative of the operation of the write line counting section;

FIGS. 10A–10I are timing charts indicative of the operation of the write address generating section;

FIGS. 18A–18D are timing charts representative of the operation of the read address generating section;

FIGS. 21(A–L) are timing charts representative of the operation of the white data adding section;

FIGS. 22(A–E) are timing charts representative of the addresses of the white data adding section;

FIGS. 23(A–H) are timing charts demonstrating the operation of the white data adding section for adding white data;

DESCRIPTION OF THE PREFERRED EMBODIMENT

Figure 30A:
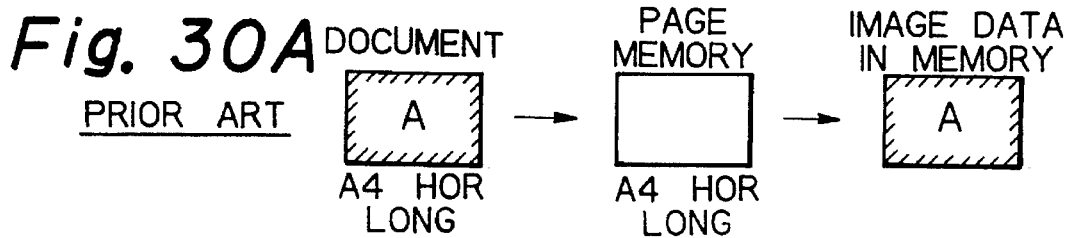
FIGS. 30A–30E are views showing how a conventional page memory system stores image data.
Figure 30B:
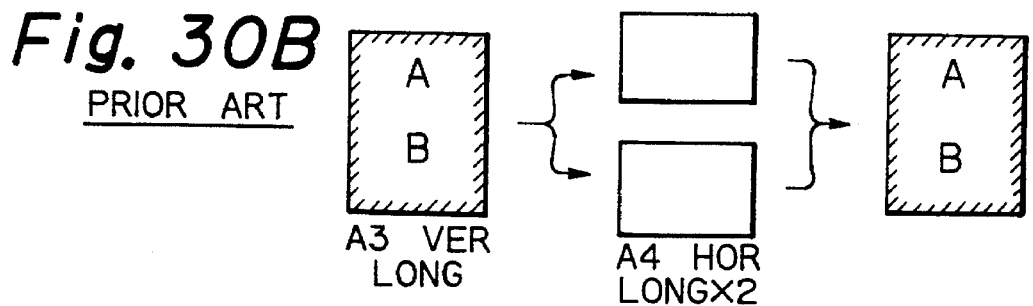

To better understand the present invention, the problem with a conventional digital copier, for example, will be described. As shown in FIG. 30A, assume that the copier has a page memory corresponding in size and orientation to a document of A4 size and oriented horizontally long, and that the copier has read an A4 horizontally long document. Then, an image can be formed correctly only if one page of image data is read out of the page memory. As shown in FIG. 30B, when a document of A3 size is positioned vertically long, the image data are written to two page memories and then read thereoutof to form an image. In this case, an arrangement may be made such that image data fully written to the first page memory begin to be read out immediately while, at the same time, image data begin to be written to the second page memory, i.e., write-in and read-out are effected at the same time. This is successful in promoting an efficient copying operation.

Figure 30C:
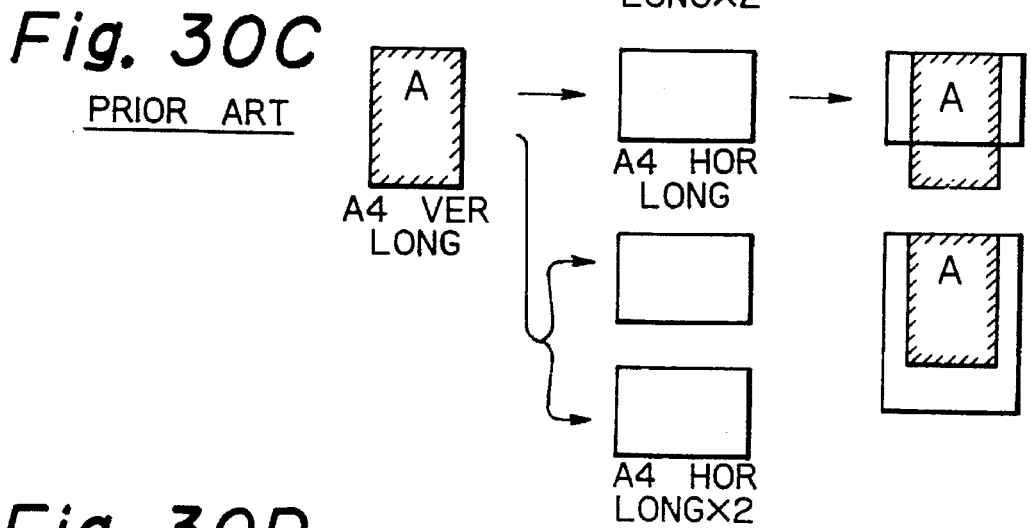
Figure 30D:
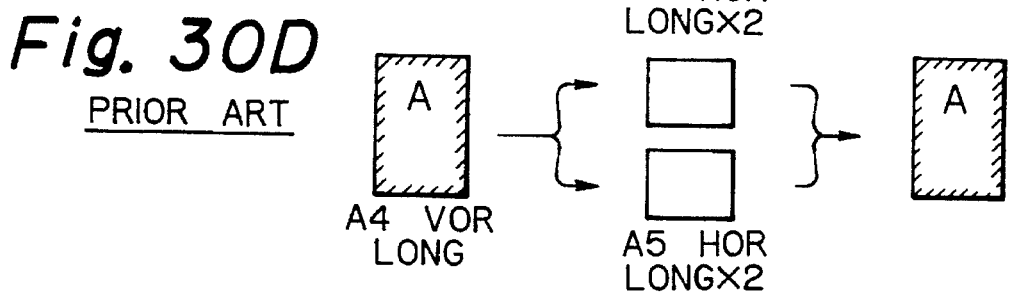
Figure 30E:
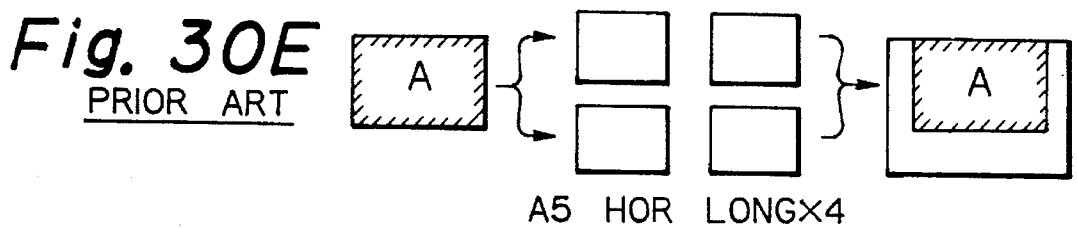

However, as shown in FIG. 30C, assume that the copier having the page memory sized to match an A4 horizontally long document has read an A4 vertically long document. Then, although the page memory is excessive in the main scanning direction, it is short in the subscanning direction. Hence, two pages memories are required, obstructing efficient use of a memory. To eliminate this problem, the page memory may be reduced in size to accommodate, for example, an A5 horizontally long document. This approach is acceptable when an A4 document is read in the vertically long position, as shown in FIG. 30D. However, when it comes to an A4 horizontally long document, as many as four page memories are needed, as shown in FIG. 3E. As a result, the memory capacity is excessive in both of the main and subscanning directions, again obstructing efficient use of a memory.

Figure 1B:
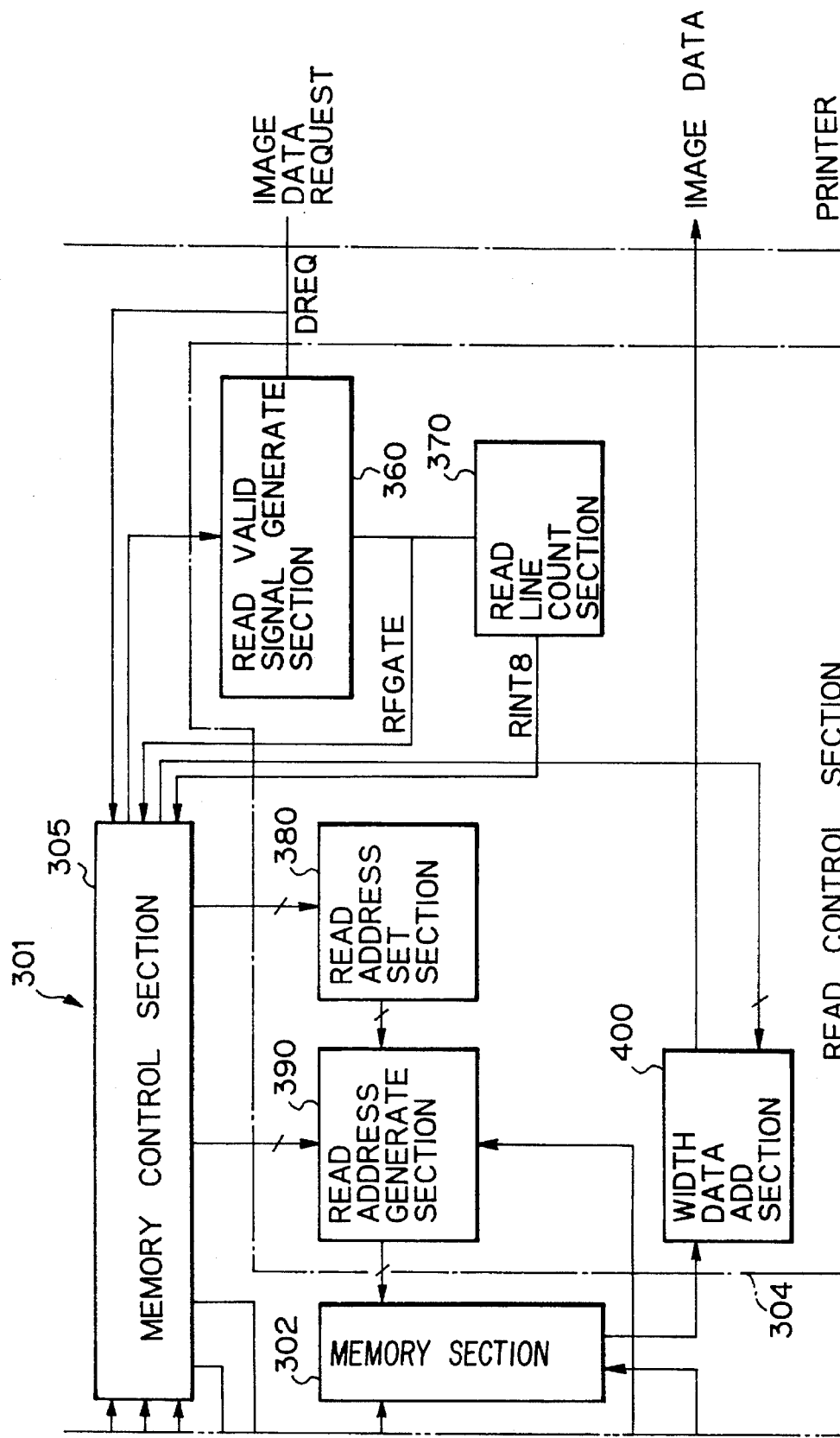
FIG. 1, consisting of FIGS. 1A and 1B, are block diagrams schematically showing a video memory arrangement forming an essential part of a digital image forming apparatus embodying the present invention.
Figure 2:
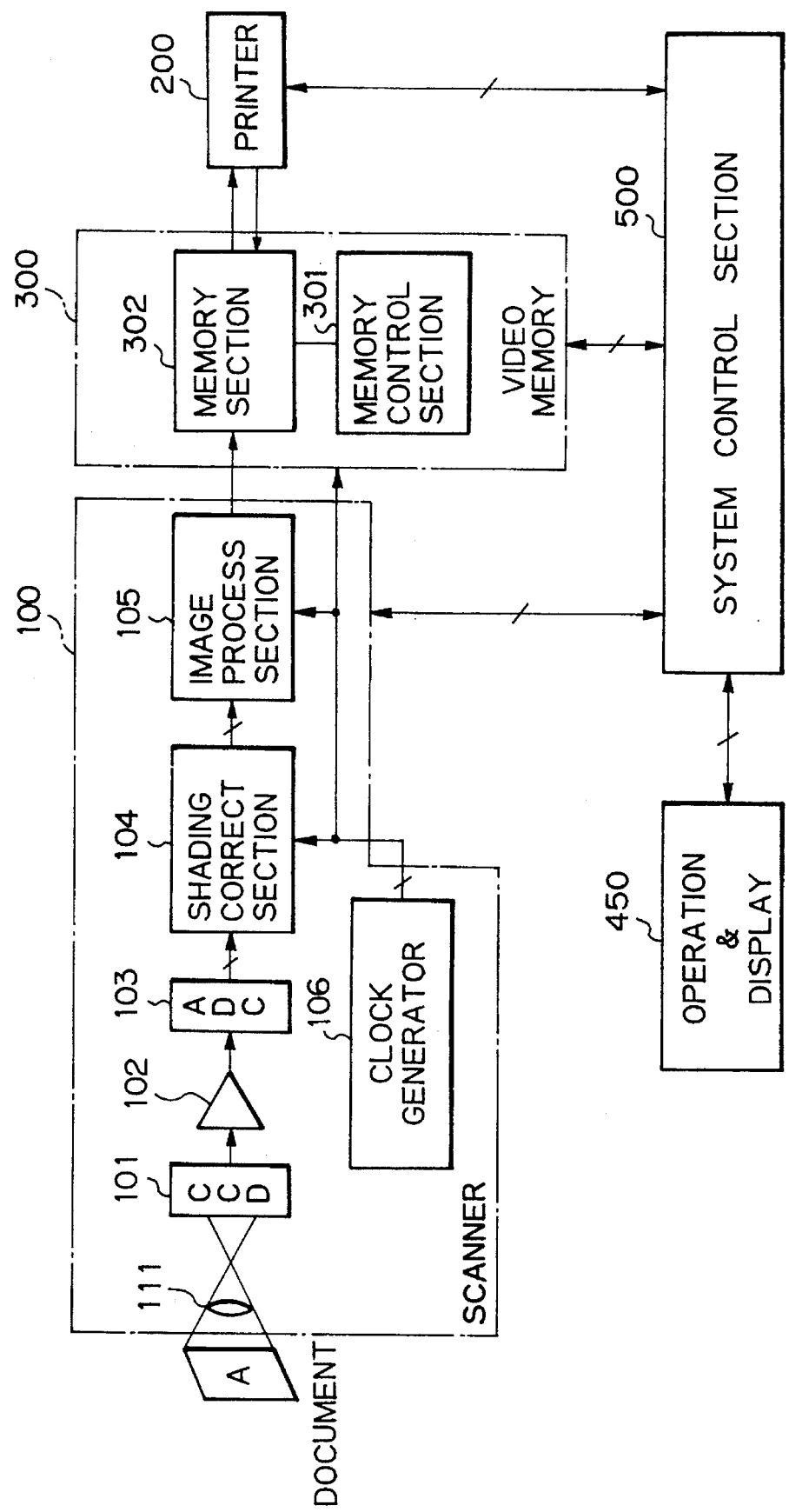
FIG. 2 is a schematic block diagram of a digital copier implemented with the video memory shown in FIG. 1.

Referring to FIG. 2 of the drawings, an image forming apparatus embodying the present invention is shown and implemented as a digital copier by way of example. As shown, the copier has a scanner 100 for reading a document. A video memory 300, which is shown in detail in FIG. 1, stores image data read from the document by the scanner 100. A printer 200 prints the image data read out of the video memory 300 on a paper. An operation and display board 450 is accessible for entering various kinds of copy modes and commands, while displaying various kinds of information. A system controller 500 controls the entire copier, particularly delivers commands for reading and writing image data.

Figure 3:
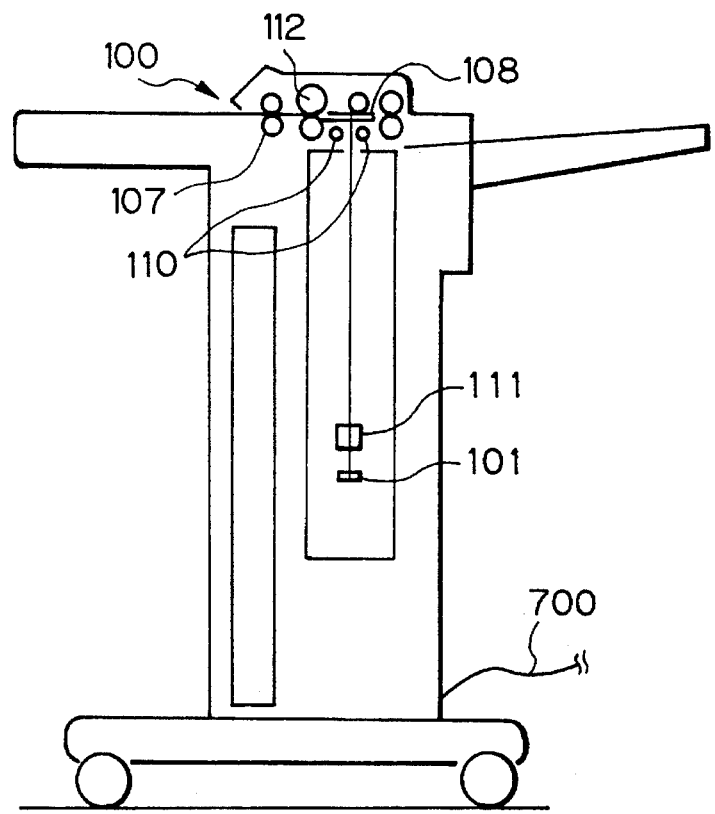
FIG. 3 is a side elevation of a scanner 2 included in the copier of FIG. 2.

As shown in FIG. 3 in detail, the scanner 100 has a conveyor roller pair 112 and a glass platen 108. A document is transported on and along the glass platen 108 by the roller pair 107. While a light source 110 illuminates the document, the resulting imagewise reflection from the document is focused by a lens 111 onto a CCD (Charge Coupled Device) image sensor 101. The CCD image sensor 101 transforms the incident light to a corresponding analog image signal. As shown in FIG. 2, the analog image signal is amplified by an amplifier 102 and then converted to digital image data by an analog-to-digital converter (ADC) 103. A shading correction circuit 104 corrects errors introduced in the digital image data due to the irregular sensitivity of the CCD array 101, the irregular emission of the light source 110, and the irregular emission distribution of the lens 111. An image processing circuit 105 performs MTF (Modulation Transfer Function) correction, magnification change processing, binarization and other conventional processing with the output of the shading correction circuit 104. The output of the image processing circuit 105 is sent to the video memory 300 over a coaxial cable 700.

Figure 4:
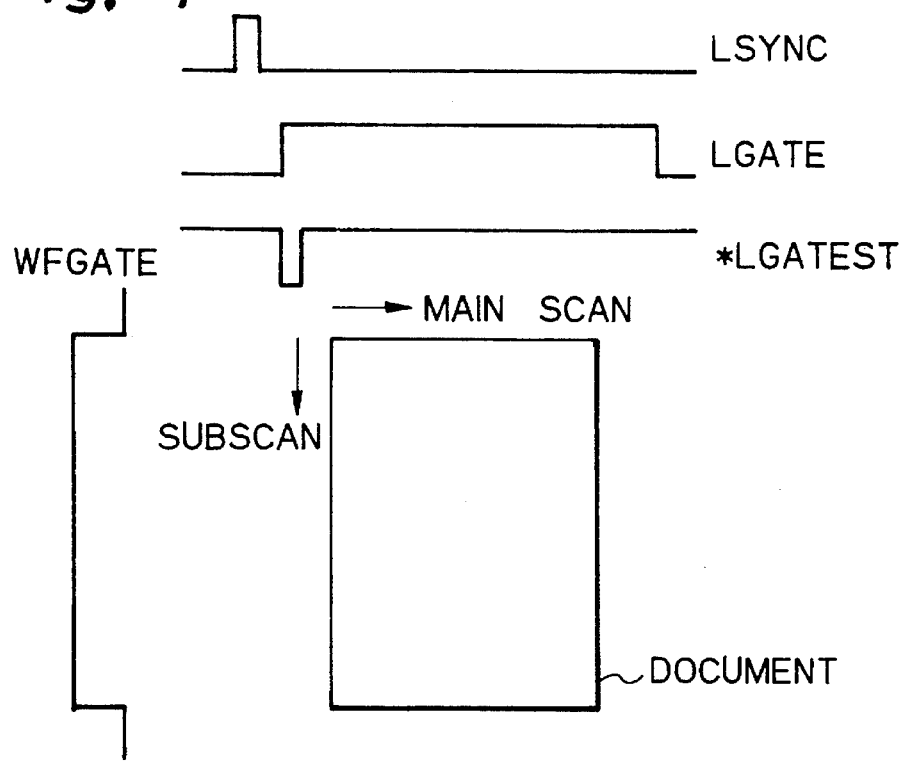
FIG. 4 shows a relation between control signals and a document.

FIG. 4 shows a relation between control signals and the position of a document. As shown, the control signals include a signal LSYNC for synchronization in the main scanning direction, a signal LGATE indicative of a maximum valid reading range in the main scanning direction, a signal *LGATEST (asterisk indicating an inverted signal and an inverting terminal) representative of the beginning of the signal LGATE, a signal WFGATE indicative of a valid reading range in the subscanning direction, which will be described in detail later, and a clock CLK generated by a clock generator 106 as a reference signal for the entire operation.

As shown in FIG. 2, the video memory 300 is generally made up of a memory control section 301 and a memory section 302. The memory section 302 is constituted by four DRAMs (Dynamic Random Access Memories) each having a capacity of 4 megabits. The total capacity of the memory section 302 corresponds to a single AO size when a document image is read at a resolution of 400 dots per inch (dpi) and at two levels. The printer 200 is basically identical with an electrophotographic processing mechanism built in an analog copier (photoconductive drum, paper transport, image transfer, paper separation, fixation, etc.). However, a writing section is particular to a digital machine and forms an electrostatic latent image on the drum by use of a laser diode or an LED (Light Emitting Element) array.

The video memory 300, which is the essential part of the illustrative embodiment, will be described with reference to FIG. 1. The memory section 302 mentioned above stores image data while the memory control section 301 controls, among others, the write address and read address meant for the memory control section 302. Specifically, the memory control section 301 has a write control section 303 (FIGS. 5–12) for controlling the location of the memory section 302 where image data should be written, a read control section 304 (FIGS. 13–23) for controlling the location of the memory section 302 where image data should be read, and a memory control section 305 (FIGS. 24–29) for controlling, for example, the calculation and management of the read and write addresses.

Figure 5:
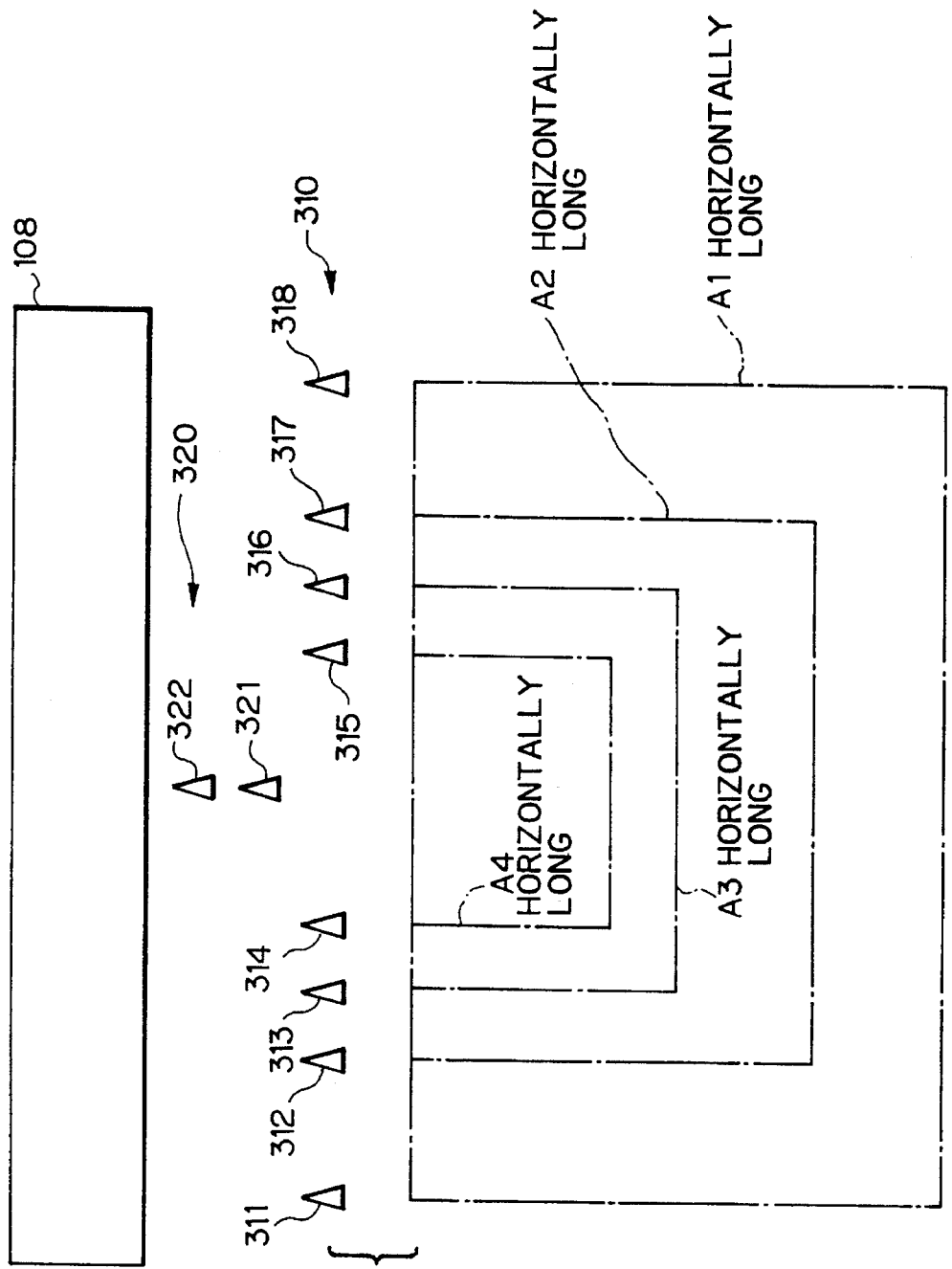
FIGS. 5A & 5B show sensors implementing a document width detecting section and document length detecting section included in the embodiment.
Figure 9:
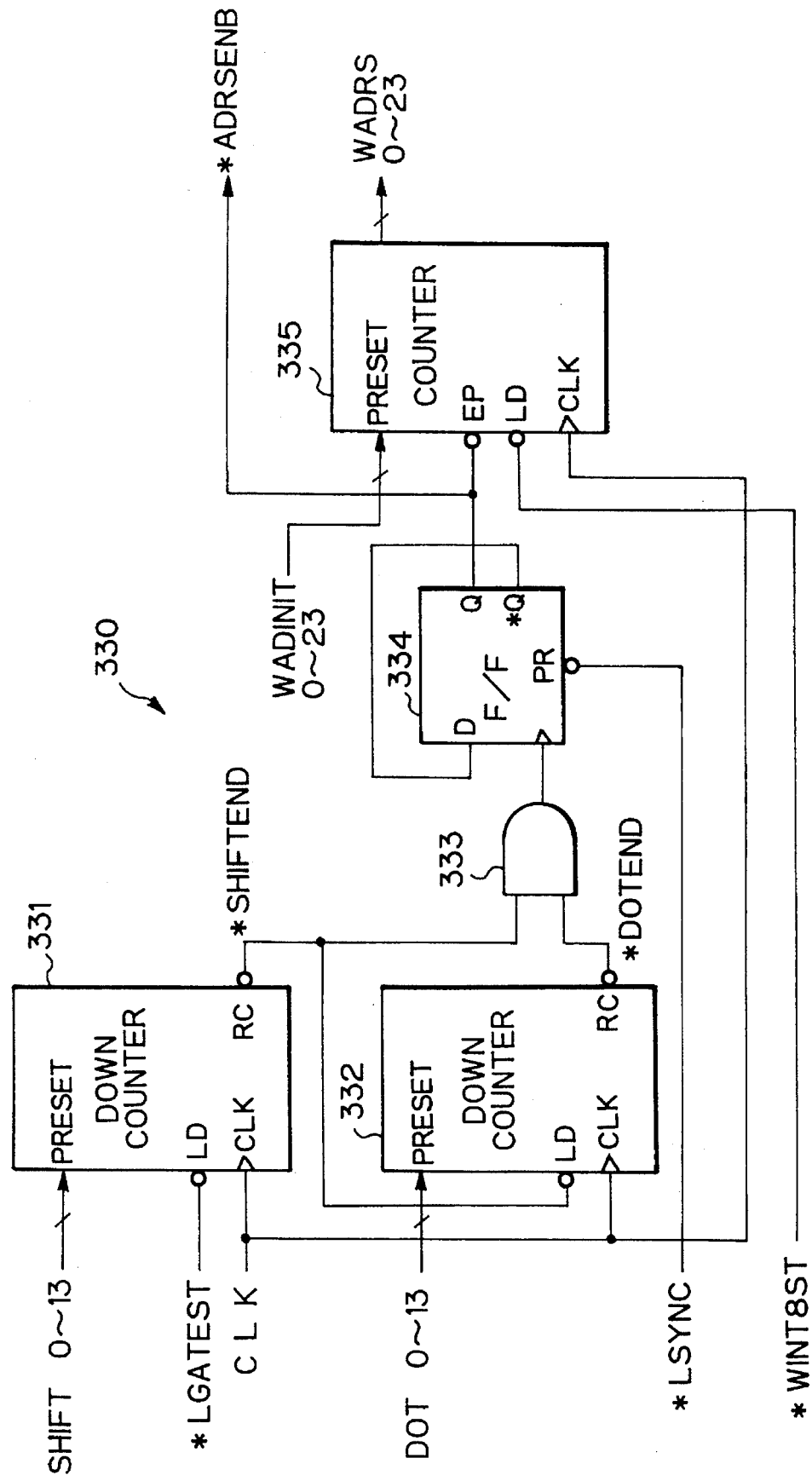
FIG. 9 is a block diagram schematically showing a write address generating section included in the embodiment.
Figure 12:
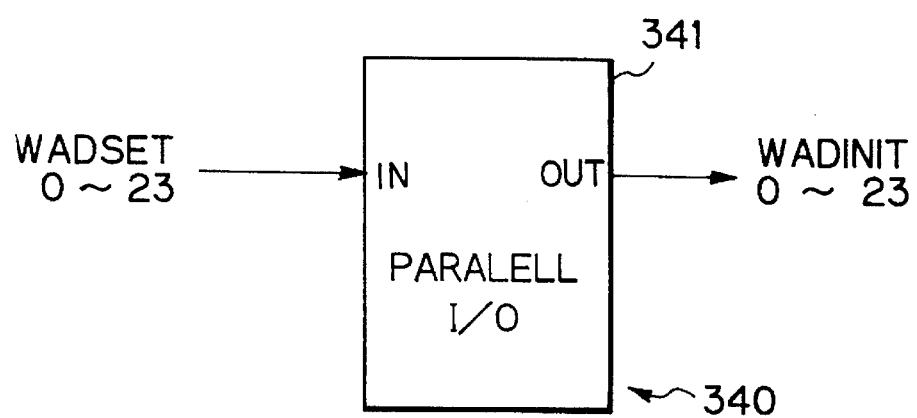
FIG. 12 is a block diagram schematically showing a write address setting section included in the embodiment.

The write control section 303 is made up of a document width detecting section 310, a document length detecting section 320, a write address generating section 330, a write address setting section 340, and a write line counting section 350. The document width detecting section 310 and the document length detecting section 320 determine respectively the width of a document, i.e., the valid range of image data in the main scanning direction and the length of a document, i.e., the valid range of image data in the subscanning direction, as shown in FIGS. 5,5(A,B), 6 and 11(A,B). The write address generating section 330 generates a write address for the memory section 302, as shown in FIGS. 9 and 10(A–I). The write address setting section 340 sets the initial value of the address meant for the address generating section 330, as shown in FIG. 12. The write line counting section 350 continuously counts the scanning lines of a document, i.e., lines for writing image data in the memory section 302 while a signal representative of the valid range of image data in the subscanning direction determined by the detecting section 320 remains valid, as shown in FIGS. 7 and 8(A–D).

Figure 13:
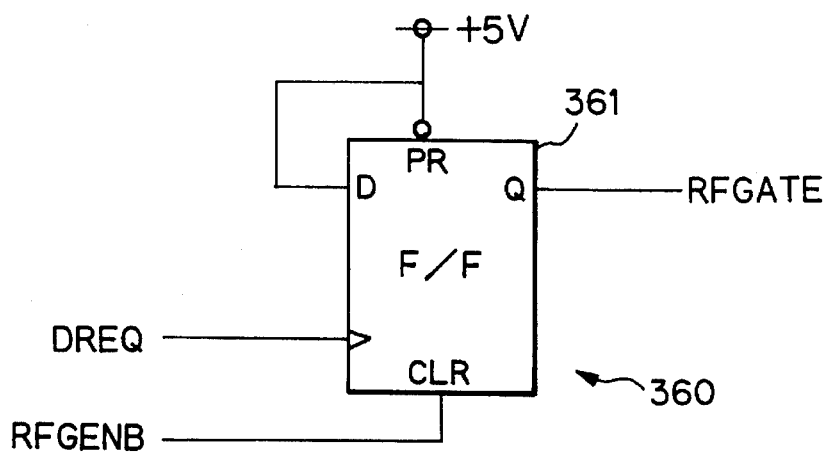
FIG. 13 is a block diagram schematically showing a read valid signal generating section included in the embodiment.
Figure 14A:
FIGS. 14A–14C are timing charts representative of the operation of the read valid signal generating section.
Figure 14B:
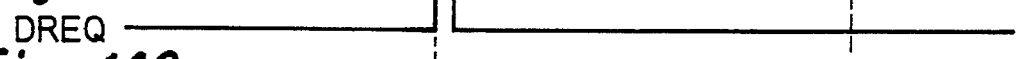
Figure 14C:
Figure 15:
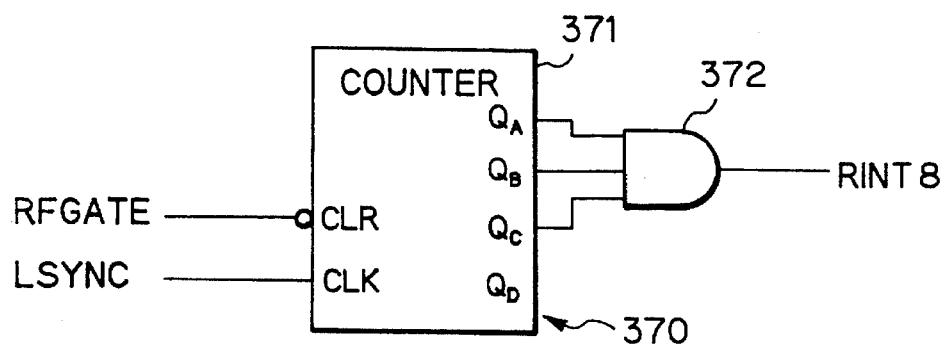
FIG. 15 is a block diagram schematically showing a read line counting section included in the embodiment.
Figure 16:
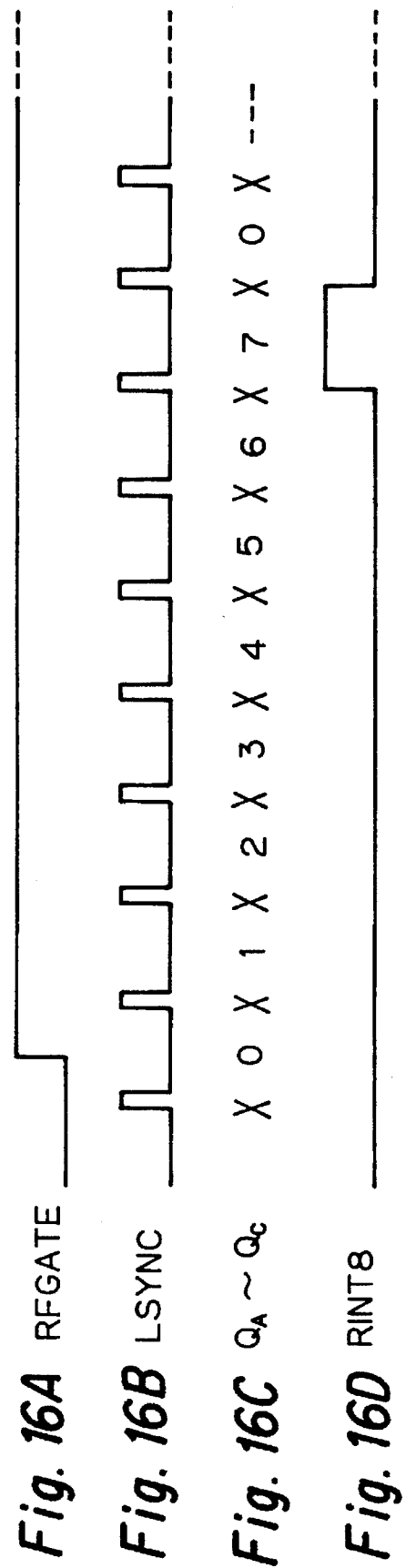
FIGS. 16A–16D are timing charts representative of the operation of the read line counting section.
Figure 17:
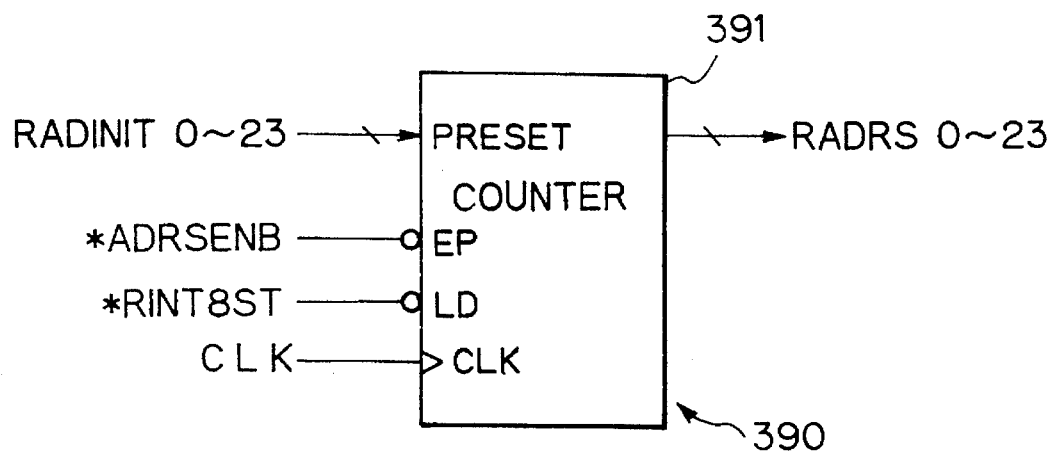
FIG. 17 is a block diagram schematically showing a read address generating section included in the embodiment.
Figure 19:
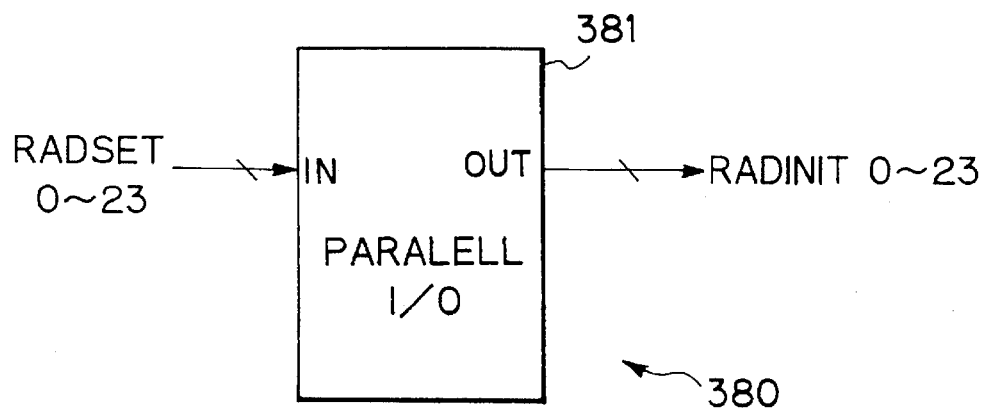
FIG. 19 is a block diagram schematically showing a read address setting section included in the embodiment.
Figure 20B:
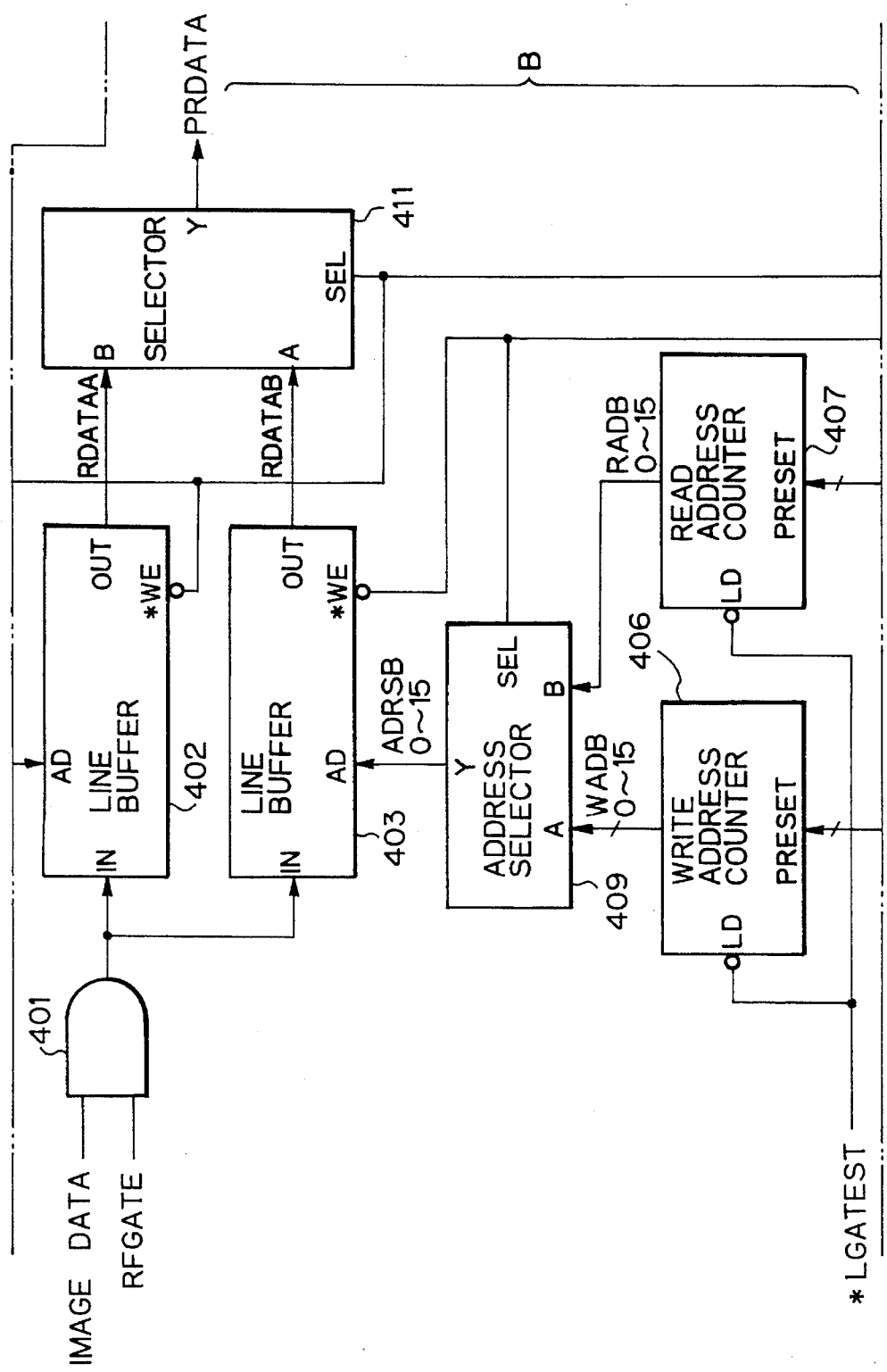
FIG. 20, consisting of FIGS. 20A, 20B, and 20C, are block diagrams schematically showing a white data adding section included in the embodiment.
Figure 20C:
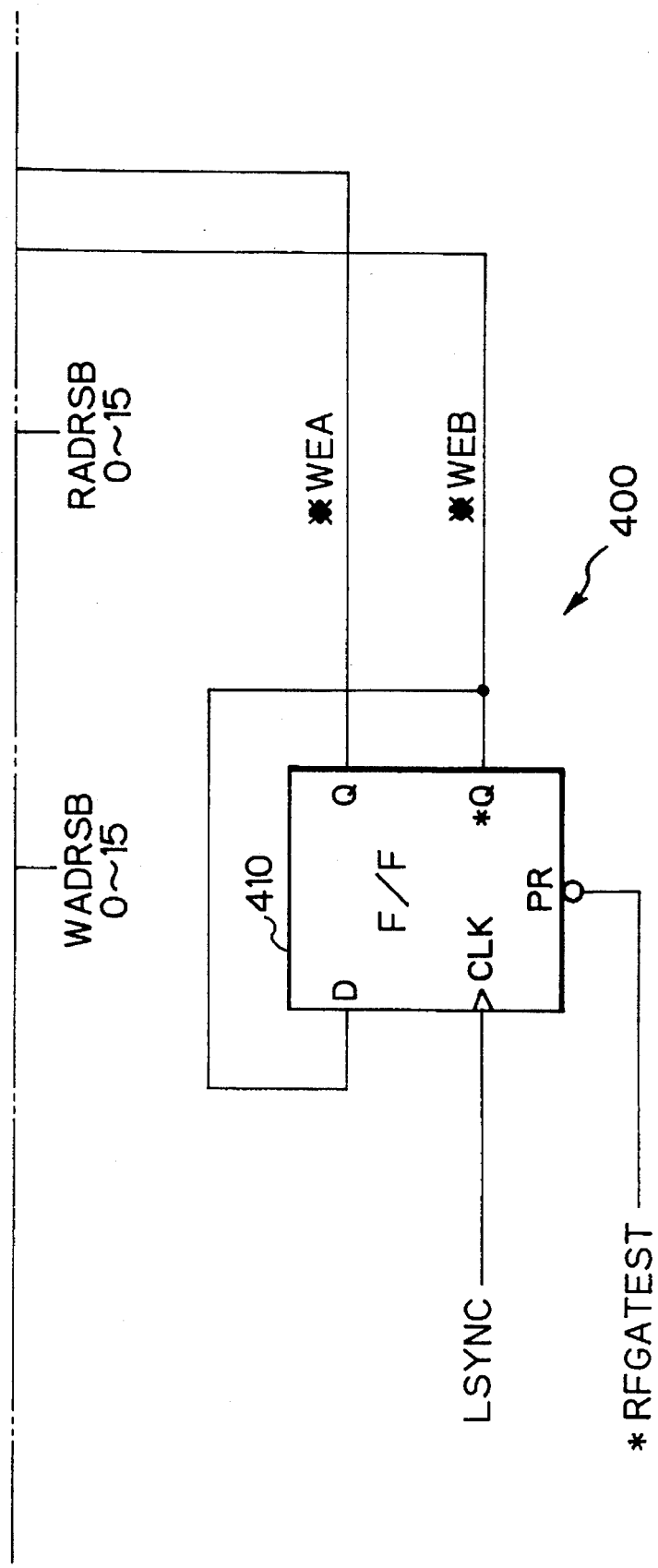
Figure 24:
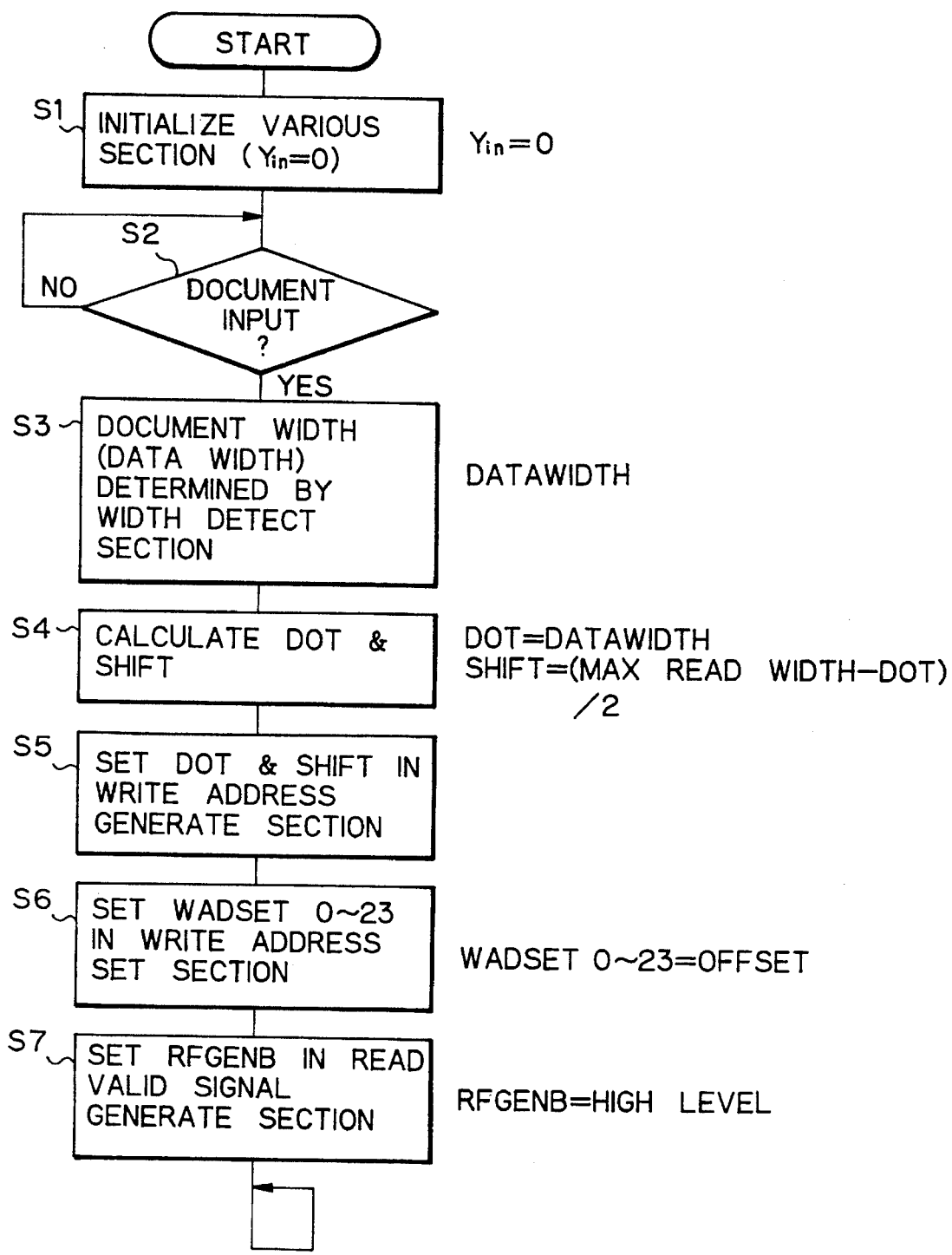
FIG. 24 is a flowchart representative of a main routine particular to a memory control section included in the embodiment.

The read control section 304 is constituted by a read valid signal generating section 360, a read line counting section 370, an address generating section 390, an address setting section 380, and a white data adding section 400. The read valid signal generating section 360 generates a read valid signal in response to an image data request signal from the printer 200, as shown in FIGS. 13 and 14(A–C). The read line counting section 370 continuously counts read lines from the memory section 302 while the read valid signal remains valid, as shown in FIGS. 15 and 16(A–D). The read address generating section 390 generates a read address for the memory section 302, as shown in FIGS. 17 and 18(A–D). The read address setting section 380 sets the initial value of the read address meant for the read address generating section 390, as shown in FIG. 19. The white data adding section 400 adds white data to image data read out of the memory section 302, as shown in FIGS. 20(A–C), 21(A–L), 22(A–E) & 23(A–F).

Figure 6:
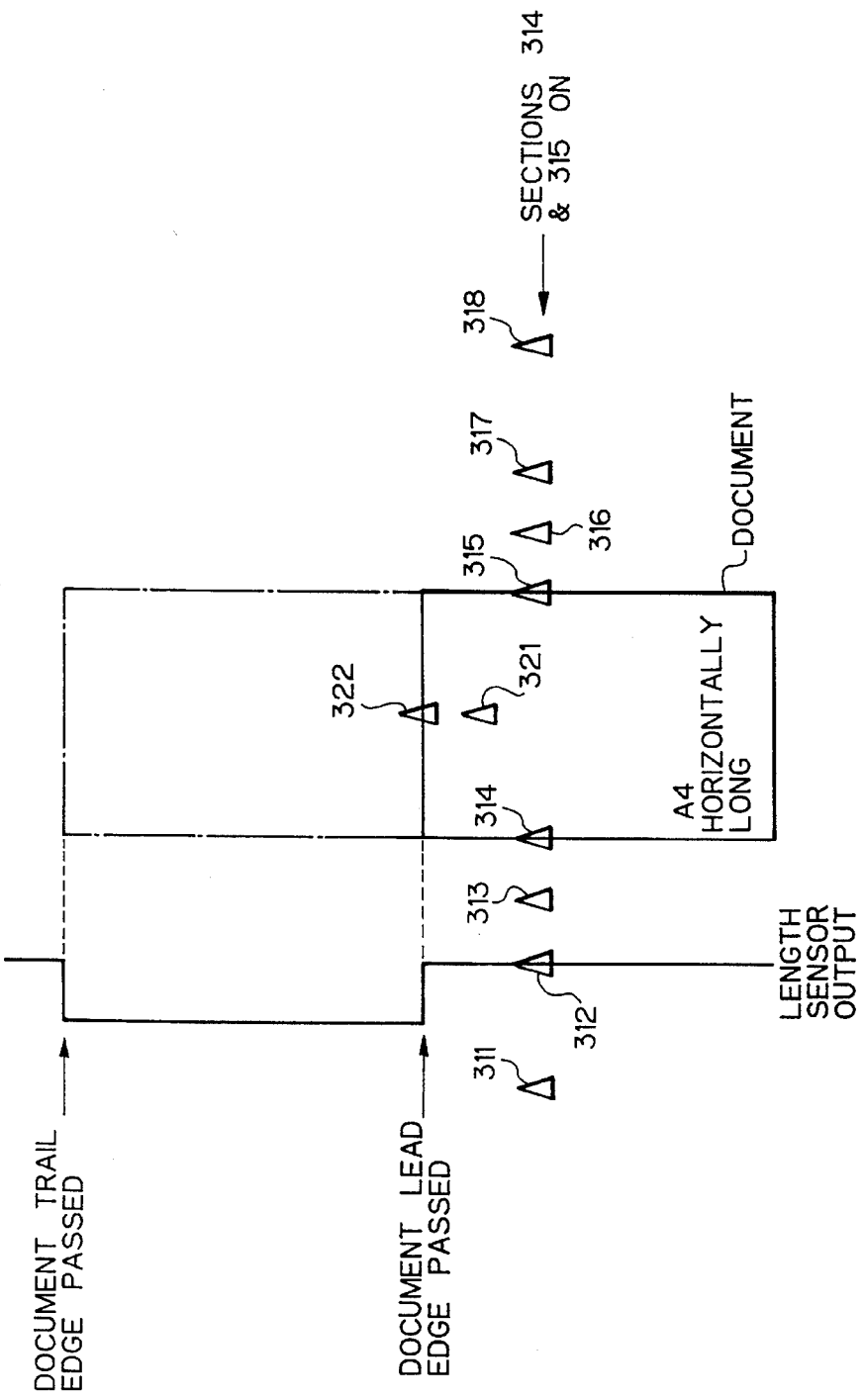
FIG. 6 demonstrates the operations of the sensors shown in FIG. 5.

The width detecting section 310 and length detecting section 320 included in the write control section 303 will be described specifically. FIGS. 5A & 5B shows width sensors 311–318 located in front of the glass platen 108 when the document transport section of the scanner 100 is seen from the above. The sensors 311–318 are responsive to A4, A3, A2 and A1 documents which are positioned horizontally long. The sensors 311–318 are of reflection type, for example. When the operator inserts a document into an inlet roller pair 107, the sensors 311–318 each turns on or turns off depending on whether or not the document is present thereover. When, an A4 horizontally long document, for example, is inserted into the roller pair 107, only the intermediate sensors 314 and 315 turn on, as shown in FIG. 6. When an A2 horizontally long document is inserted, the sensors 312–217 other than the outermost sensors 311 and 318 turn on. The combination of the sensors turned on indicate the width of the document. The resulting document width signal DATAWIDTH is applied to the memory control section 305. In response, the memory control section 305 determines the width of the document and delivers a corresponding signal to the write address generating section 330. As soon as the document width is determined, a pinch solenoid, not shown, operatively connected to the driven roller of the inlet roller pair 107, FIG. 3, is driven to release the driven roller from the coactive drive roller. Then, the document is allowed to advance deeper into the scanner 100.

At the same time, the light source 110 is turned on to prepare for the illumination of the document. As shown in FIG. 5, when the document is moved deeper into the scanner 100 until the leading edge thereof contacts a gate pawl, not shown, a document sensor 321 following the width sensors 311–318 turns on. As a result, a motor, not shown, is driven to rotate a conveyor roller 112, FIG. 3, while a gate solenoid, not shown, associated with the gate pawl is driven to open it. In this condition, the document is transported on and along the glass platen 108 by the conveyor roller 112. As shown in FIGS. 5A–5B and 6, a length sensor 322 follows the document sensor 321 and turns on when the leading edge of the document reaches it. As soon as the trailing edge of the document moves away from the length sensor 322, the sensor 322 turns off. As a result, while the document is moving over the length sensor 322, the valid range signal WFGATE, FIG. 4, is continuously applied to the memory controller 305 and write line counting section 350, FIG. 1.

As shown in FIG. 7, the write line counting section 350 has a counter 351 and an AND gate 352. The counter 351 receives the valid range signal WFGATE assigned to the subscanning direction and the signal LSYNC for synchronization in the main scanning direction at a clear terminal CLR and a clock terminal CLK, respectively. The counter 351 delivers an output $Q_A$–$Q_C$ thereof to an AND gate 352.

The operation of the write line counting section 350 will be described with reference to FIGS. (8A–8D). When the leading edge of the document arrives at the length sensor 322, the signal WFGATE goes high. Then, the output $Q_A$–$Q_C$ of the counter 351 having been cleared (count "0") is set. Thereafter, every time one line of the document is scanned and the positive-going edge of the signal LSYNC is applied to the clock terminal CLK, the counter 351 counts up. When the count reaches a count "7" ($A_Q$–$A_C$=high level), the output WINT8 of the AND gate 352 goes high. Then, the count of the counter 351 returns to "0". As a result, the output WINT8 of the AND gate 35 goes high for one period of the signal LSYNC every time eight consecutive lines of the document are scanned while the valid range signal WFGATE is in a high level. As shown in FIG. 1, the signal WNT8 is applied to the memory control section 305 so as to implement interrupt processing shown in FIG. 25.

Figure 11A:
FIGS. 11A & 11B are views for describing the initial set value of the write address generating section.
Figure 11B:
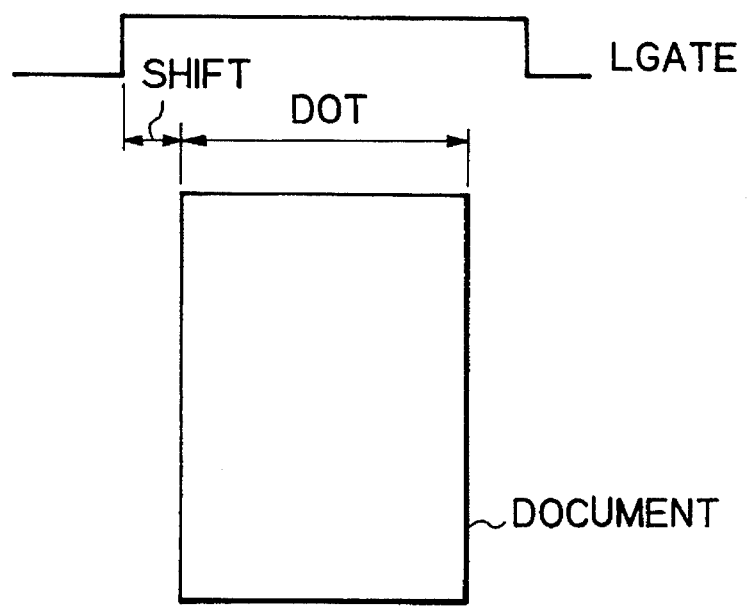

A reference will be made to FIGS. 9–11 for describing the write address generating section 330. As shown in FIG. 9, the address generating section 330 is made up of down counters 331 and 332, an AND gate 333, a flip-flop (F/F) 334, and a counter 335. The down counters 331 and 332 each include a preset input. The memory control section 305 presets on the preset inputs of the down counters 331 and 332 a signal SHIFT 9–13 and a signal DOT 0–13, respectively. As shown in FIG. 11, the signal SHIFT 9–13 is indicative of the position of the left edge of the document as measured from the position where the signal LGATE indicative of the maximum readable range in the main scanning direction begins. The signal DOT 0–13 is indicative of the actual width of the document. Specifically, although the left edge SHIFT 0–13 and width DOT 0–13 of the document are dependent on the document size, the memory control section 305 determines the values SHIFT 0–13 and DOT 0–13 on the basis of the output DATAWIDTH of the width detecting section 310 (usually, DATAWIDTH=DOT 0–13) and sets them on the down counters 31 and 332. This will be described specifically later with reference to FIG. 24. The down counter 331 receives a signal *LGATEST indicative of the beginning of the signal LGATE at a load terminal LD while receiving the clock CLK at a clock terminal CLK. When the signal *LGATEST goes low, the preset value SHIFT is loaded. Thereafter, the down counter 331 sequentially counts down in synchronism with the clock CLK.

When the down counter 331 counts down the preset value SHIFT, a borrow occurs with the result that the counter output *SHIFTEND goes low. However, since the signal *SHIFTEND is applied to the clock terminal CLK of the F/F 334 via the AND gate 333 and since the the F/F 334 has been preset by the inverted signal *LSYNC of the signal LSYNC and has caused the input D (=output *Q) thereof to go low, the Q output *ADRSENB of the F/F 334 goes low at the leading edge of the counter output S*SHIFTEND. Further, since the output *SHIFTEND of the down counter 331 and the clock signal CLK are applied to the down counter 332, the preset value DOT is loaded. Thereafter, the down counter 332 sequentially counts down in synchronism with the clock CLK. When the down counter 332 has counted down the preset value DOT, a borrow occurs with the result that the output *DOTEND of the counter 332 goes low. However, the Q output *ADFSENDB of the F/F 334 goes high since the signal *DOTEND is applied to the clock terminal CLK of the F/F 334 via the AND gate 333.

The counter 335 is operated as follows. The memory control section 305 presets the initial value WADINIT 0–23 of the write address on the preset input of the counter 335 via the write address setting section 340. The initial value WADINIT 0–23 is loaded by a load signal *WINT8ST which goes low for one clock pulse from the beginning of the output WINT8 of the write line counting section 350. As a result, the address WADRS 0–23 for the memory section 302 is set at the initial value WADINIT 0–23. Since the Q output *ADRSENB of the F/F 334 is input to the count enable terminal EP of the counter 335, the counter 335 does not count up when *ADRSENB is in a high level, preventing the write address WADRS 0–23 from changing. When the Q output *ADRSENB goes low, the counter 335 counts up to update the write address WADRS 0–23 with the result that one line of image data present in the document width DOT is written to the memory section 302. Also, the Q output *ADRSENB is applied to the read address generating section 390, as will be described with reference to FIGS. 17 and 18.

As shown in FIG. 12, the write address setting section 340 is implemented by a parallel I/O (Input/Output) 341. The memory control section 305 calculates the initial value WADSET 0–23 of the write address on the basis of the output DATAWIDTH of the width detecting section 310 and the output WINT8 of the write line counting section 350 and feeds the initial value WADSET 0–23 to the input IN of the parallel I/O 341. The parallel I/O 341 holds the value WADSET 0–23 as the initial value WADINIT 0–23 until the next initial value WADSET 0–23 arrives.

A reference will be made to FIGS. 13–23 for describing the read control section 304. To begin with, as shown in FIG. 13, the read valid signal generating section 360 is implemented by an F/F 361. Until the memory control section 305 determines that the memory section 302 is enabled, it maintains a signal RFGENB applied to the clear terminal CLR of the F/F 361 in a low level. In this condition, the Q output of the F/F 361, i.e., RFGATE remains in a low level. As shown in FIG. 14, when the memory control section 305 turns the signal RFGENB to a high level by determining that the memory section 302 is enabled, the read valid signal RFGATE is ready to be output. In this condition, when the printer 200 sends an image data read request signal DREQ to the F/F 361, the signal RFGATE goes high at the positive-going edge of the signal DREQ since a D input is held in a high level. When image data have been read out, the memory control section 305 turns the signal RFGENB to a low level with the result that the read valid signal RFGATE disappears (or goes low). As shown in FIG. 1, the read valid signal RFGATE is fed to the read line counting section 370 and memory control section 306 and implements control which will be described.

As shown in FIG. 15, the read line counting section 370 is made up of a counter 371 and an AND gate 372. The read valid signal generating section 360 delivers the read valid signal RFGATE to the clear terminal CLR of the counter 371. The signal LSYNC for main scan synchronization is applied to the clock terminal CLK of the counter 371. The output $Q_A$–$Q_C$ of the counter 371 is input to the AND gate 372.

Assume that the memory control section 305 has determined that image data can be read and turned the signal RFGENB to a high level, that the image data read request signal DREQ from the printer 200 has been input, and that the read valid signal RFGATE has gone high, as stated above. Then, as shown in FIG. 16, the output $Q_A$–$Q_C$ of the counter 371 having been cleared is set. As a result, the counter 371 counts up every time the positive-going edge of the signal LSYNC arrives at the clock terminal CLK, i.e., every time one line of the document is scanned. When the counter 371 reaches "7" ($Q_A$–$Q_C$=high level), the output RINT8 of the AND gate 322 goes high. Thereafter, the counter 371 returns to "0". Hence, the output RINT8 of the AND gate 372 goes high for one period of the signal LSYNC every time eight lines of the document are read. As shown in FIG. 1, the signal RINT8 is fed to the memory control section 305 to implement RINT8 interrupt processing shown in FIG. 27.

As shown in FIG. 17, the read address generating section 390 is implemented by a counter 391. The operation of the counter 391 will be described with reference to FIG. 18. The read address setting section 380 sets on the preset input of the counter 391 the initial value RADINIT 0–23 to be generated in the memory section 302. This is effected by a signal *RINT8ST which remains in a low level for the duration of one clock from the beginning of the output RINT8 of the read line counting section 370. Hence, a read address RADRS 0–23, which is the output of the counter 391, is set at the initial value RADINIT 0–23. The output *ADRSENB of the write address setting section 330 is input to the count enable terminal EP of the counter 391. Therefore, the counter 391 does not count up when the signal *ADRSENB is in a high level, despite that the clock CLK arrives; the read address RADRS 0–23 remains in the initial value RADINIT 0–23. However, when the signal *ADRSENB goes low, the counter 391 counts up to update the address RADRS 0–23. As a result, one line of image data lying in the document width DOT is read out of the memory section 302.

As shown in FIG. 19, the read address setting section 380 is constituted by a parallel I/O 381. The memory control section 305 calculates the initial address RADSET 0–23 of a read address on the basis of the output DATAWIDTH of the width detecting section 310 and the output RINT8 of the read line counting section 370 and delivers it to the input IN of the parallel I/O 381. The parallel I/O 381 holds the input value RADSET 0–23 as the initial value RADINIT 0–23 until the next initial value RADSET 0–23 arrives from the memory control section 305. The white data adding section 400 will be described with reference to FIGS. 20–23. As shown in FIG. 20, the white data adding section 400 has an AND gate 401 to which the image data from the memory section 301 is applied. The consecutive lines of image data from the AND gate 401 are alternately written to and read out of line buffers 402 and 403. Write address counters 404 and 406 and read address counters 405 and 407 are respectively associated with the line buffers 402 and 403. Address selectors 408 and 409, select respectively the addresses of the address counters (404, 405) and (406, 407). A selector 411 selects image data from the line buffers 402 and 403. The reference numeral 410 designates an F/F 410.

The operations of the line buffers 402 and 403, F/F 410 and selector 411 will be described with reference to FIG. 21. The signal *RFGATEST, which remains in a low level for the duration of one clock from the beginning of the read valid signal RFGATE, is applied to the preset input PR of the F/F 410. Since the signal *RFGATEST remains in a high level when no image data is read out of the memory section 302, the Q output *WEA and *Q output *WEB of the F/F 410 respectively go low and go high alternately in synchronism with the positive-going edges of the synchronizing signal LSYNC applied to the clock terminal CLK. When image data is read out of the memory section 302, the read valid signal generating section 360 generates the read valid signal RFGATE. Then, the signal *RFGATEST goes low with the result that the Q output *WEA and the *Q output *WEB go high and go low, respectively. Thereafter, these outputs *WEA and *WEB go low and go high alternately in synchronism with the positive-going edges of the signal LSYNC.

As shown in FIG. 20, the Q output *WEA and the *Q output *WEB are fed to the write enable terminals *WE of the line buffers 402 and 403, respectively. Hence, image data is written to the line buffer 402 via the AND gate 401 when the signal *WEA is in a low level or to the line buffer 403 via the AND gate 401 when the signal *WEB is in a low level. When the signal *WEA or *WEB is in a high level, the data is read out of the line buffer 402 or 403 and fed to the selector 411. In this manner, image data are written to and read out of the line buffers 402 and 403 in a toggle fashion. Applied with the Q output *WEA as a select signal SEL, the selector 411 selects data RDATAA read out of the buffer 402 when the signal *WEA is in a high level or selects data RDATAB read out of the line buffer 403 when the signal *WEA is in a low level. The data RDATAA and RDATAB are transferred to the printer 200 as print data PRDATA.

Referring to FIGS. 21 and 22, the operations of the address counters 404 and 405 and address selector 408 will be described. The address counters 404 and 405 generate respectively a write address WADA 0–15 and a read address RADA 0–15 for the line buffer 402. The initial value WADRSA 0–15 of the write address and the initial value RADRSA 0–15 of the read address are respectively input to the preset inputs of the address counters 404 and 405 from the memory control section 305. These initial values WADRSA and RADRSA are each loaded by the signal *LGATEST indicative of the beginning of the maximum readable valid range LGATE in the main scanning direction. Thereafter, the address counters 404 and 405 count up respectively the write address WADA 0–15 and the read address RADA 0–15 in synchronism with the clock, while delivering them to the address selector 408. The address selector 408 receives the Q output *WEA of the F/F 410 as a select signal SEL. Hence, when the Q output *WEA is in a low level, i.e., when data should be written to the line buffer 402, the address selector 408 selects the write address WADA 0–15. When the Q output *WEA is in a high level, i.e., when data should be read out of the line buffer 402, the address selector 408 selects the read address RADA 0–15. The write address WADA 0–15 and read address RADA 0–15 are applied to the address terminal AD of the line buffer 402.

In practice, the initial value WADRSA 0–15 of the write address is selected to be "0". As shown in FIG. 11, the initial value RADRSA 0–15 of the read address is identical with a value *SHIFT generated by inverting the individual bits of the value SHIFT which is based on the output DATAWIDTH of the width detecting section 310. The address counters 406 and 406 and address selector 409 are identical in construction and operation as the address counters 404 and 405 and address selector 408 and will not be described in order to avoid redundancy.

The operation of the white data adding section 400 having the above construction will be described more specifically with reference to FIG. 23. As shown in FIG. 20, the read valid signal generating section 360 feeds the read valid signal RFGATE to the line buffers 402 and 403 via the AND gate 401. Therefore, when the signal RFGATE is in a low level, image data read out of the memory section 302 is masked by the AND gate 401. As a result, white data is written to the line buffers 402 and 403 on the basis of the write addresses WADA 0–15 and WADB 0–15, respectively, thereby cleaning data stored therein. When the read valid signal RFGATE is in a high level, image data read out of the memory section 302 are input to the line buffers 402 and 403. At this instant, after the initial synchronizing signal LSYNC has been input just after the change of the signal RFGATE to a high level, the line buffer 402 is in a write mode; image data on the first line are sequentially written from the address "0". Although the line buffer 403 is in a read mode, the white data are directly read out since no image data have not been written yet.

On the arrival of the next synchronizing signal LSYNC, the write mode and read mode are replaced with each other. Hence, the image data on the first line are read out of the line buffer 402 while image data on the the second line are written to the line buffer 403. At this instant, RADRSA 0–15 of the read address RADA 0–15 set in the line buffer 402 is identical with the previously mentioned value *SHIFT. Therefore, assuming that the value SHIFT is "24" in hexadecimal notation (represented by "24H" hereinafter), then RADRSA is "FFDBH" since the address has sixteen bits. Specifically, the read address RADA 0–15 becomes "FFFFH" on counting 24H and then becomes "0000H". Consequently, the image data read out of the line buffer 402 are made up of the image data read out of the memory section 302, and the value SHIFT of white data preceding them. Such image data are identical with the image data read by the scanner 100 from the document. In this manner, image data are alternately written to and read out of the line buffers 402 and 403 line by line while being provided with a particular amount of white data corresponding to the value SHIFT.

A reference will be made to FIGS. 24–29 for describing a specific operation of the main control section 305, FIG. 1. The main control section 305 has a CPU (Central Processing Unit), a ROM (Read Only Memory), a RAM, and an interrupt controller or similar peripheral unit, although not shown in the figure. The CPU executes main control or routine shown in FIG. 24 according to a program stored in the ROM. To begin with, when a power source is turned on, the CPU initializes the interrupt controller, parallel I/Os, variables to be handled by the program, a counter $Y_{in}$ representative of the number of times that WNT8 interrupt processing is executed, and so forth (step S1). In the next step S2, the CPU waits until a copy has been inserted into the scanner and a copying operation has begun. When a document is inserted into the scanner 100 (YES, step S2), the width detecting section 310 produces a document width signal DATAWIDTH (step S3). Then, the CPU calculates a signal SHIFT indicative of the position of the left edge of the document (step S4) and sets it in the write address generating section 330 (step S5). At the same time, the CPU sets the initial value WADSET 0–23 (=OFFSET) of the write address in the write address setting section 340 (step S6). Thereafter, the CPU turns the signal RFGENB input to the read valid signal generating section 360 to a high level (step S7), thereby validating the image data read request signal DREQ from the printer 200. Subsequently, the CPU enters an endless loop and awaits an interruption which will be described.

Figure 25:
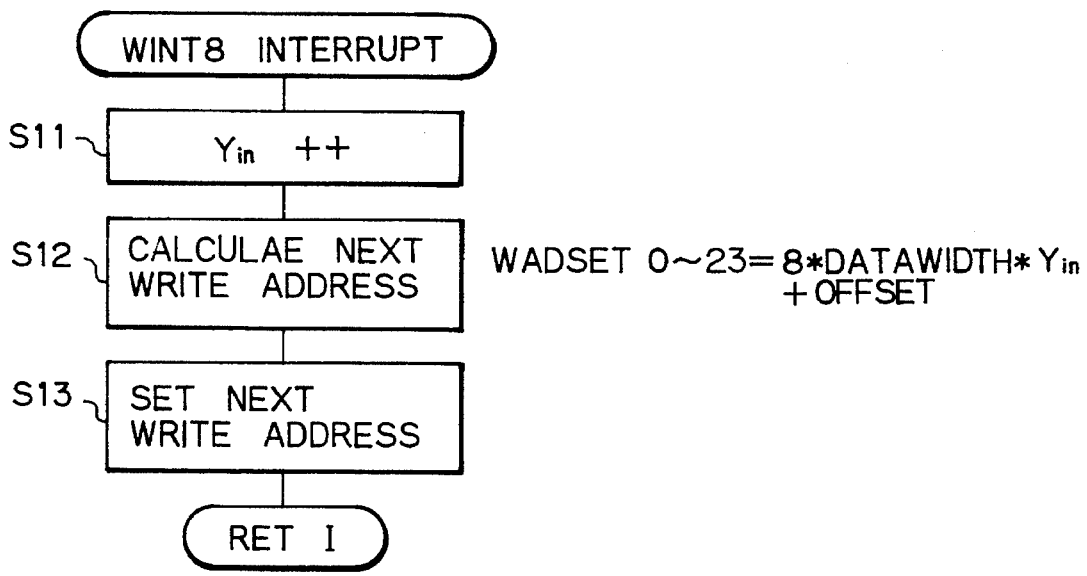
FIG. 25 is a flowchart representative of a WINT8 interrupt procedure to be executed by the memory control section.

FIG. 25 shows a WINT8 interrupt routine. After the detection of the document width DATAWIDTH, the scanner 100 starts scanning the document. When the read valid range signal WFGATE assigned to the subscanning signal goes high, eight consecutive lines of the document are scanned. Then, the output WINT8 of the write line counting section 350 goes high, as stated previously with reference to FIG. 7. The CPU starts on the WINT8 interrupt routine in response to the change of the signal WINT8 to a high level. First, the CPU increments the counter $Y_{in}$, which indicates the frequency of WINT8 interrupt processing executed, by 1 (one) (step S11). Since this counter $Y_{in}$ has been initialized in the step 1, FIG. 24, the initial count $Y_{in}$ is "1". Next, the CPU calculates the address of the memory section 302 for writing the next eight lines of data by using the following equation (step S12):

$$WADSET\ 0\text{--}23 = 8*DATAWIDTH*Y_{in} + OFFSET$$

In the above equation, since an interruption occurs every eight lines, the amount of one line of data DATAWIDTH is multiplied by "8" and further by the frequency of interruption $Y_{in}$, and the initially set write address OFFSET is added to the resulting product. The CPU sets the result of calculation, i.e., WADSET 0–23 in the write address setting section 340 (step S13) and completes the interrupt processing. Thereafter, the CPU enters into the endless loop of the main routine, FIG. 24, and awaits an interruption. In this manner, every time a WINT8 interruption occurs, the CPU writes image data in the memory section 302 while controlling the write address of the memory section 302 for storing the next eight lines of data.

Figure 26:
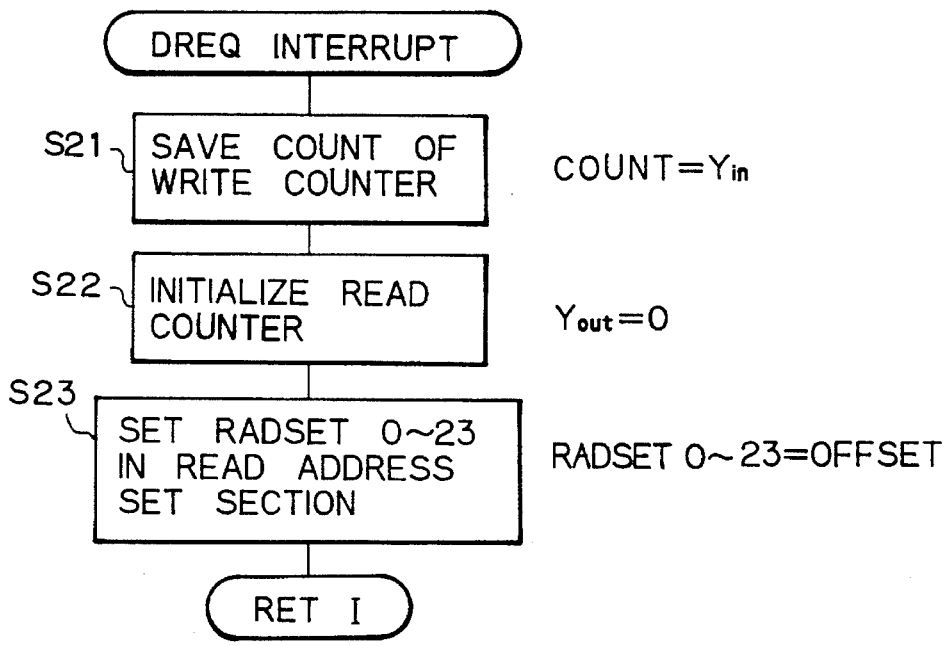
FIG. 26 is a flowchart representative of a DREQ interrupt procedure to be executed by the memory control section.

FIG. 26 shows a DREQ interrupt procedure. Assume that the scanner 100 has scanned the document to a certain extent, and the resulting image data have been written to the memory section 302. Then, as a paper is fed toward a development start position in the printer 200, the printer 200 sends an image data read request signal DREQ to the memory control section 305. In response, the CPU starts on the DREQ interrupt routine. First, the CPU saves the content of the write counter $Y_{in}$ indicative of the frequency of WINT8 interrupt processing executed in a counter COUNT (step S21). Subsequently, the CPU initializes a read counter $Y_{out}$ to be used by the program in the event of reading ($Y_{out}=0$) (step S22), sets a read address RADSET 0–23 (=OFFSET=head of write address) as the head of the read address of the memory section 302 (step S23), and then ends the interrupt processing.

Figure 27:
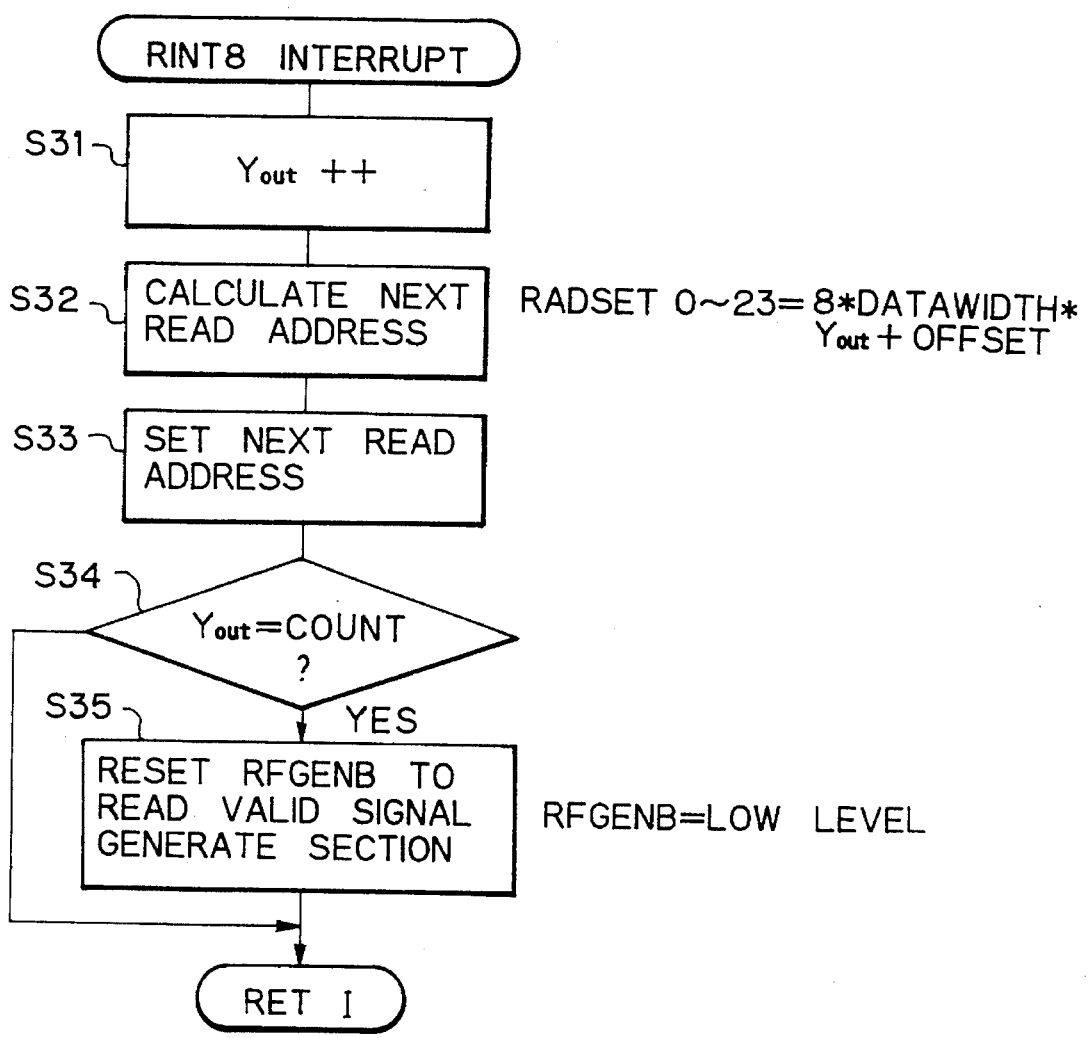
FIG. 27 is a flowchart representative of an RINT interrupt procedure to be executed by the memory control section.

FIG. 27 shows an RINT8 interrupt procedure. When the printer 200 sends an image data read request signal DREQ to the memory control section 305, the read valid signal generating section 360 generates a read valid signal RFGATE. Then, every time eight consecutive lines of image data are read out of the memory section 302, the read line counting section 370 outputs a signal RINT8. The CPU starts on the RINT8 interrupt routine in response to the signal RINT8. First, the CPU increments the read counter $Y_{out}$ by 1 (step (S31). The first content $Y_{out}$ of this counter is "1" since it has been initialized in the step S22 of the DREQ interrupt processing, FIG. 26. Next, the CPU calculates a read address of the memory section 302 for reading the next eight lines of data by use of the following equation (step S32):

$$RADSET\ 0\text{--}23 = 8*DATAWIDTH*Y_{out} + OFFSET$$

In the above equation, since an interruption also occurs every eight lines, the amount of one line of data DATAWIDTH is multiplied by "8" and further by the frequency of interruption $Y_{out}$, and the initially set write address is added to the resulting product. The CPU sets the result of calculation RADSET 0–23 in the read address setting section 380 (step S33) and then compares the contents of the read counter $Y_{out}$ and counter COUNT (step S34).

In the initial stage of document reading, the content of the read counter $Y_{out}$ is smaller than that of the counter COUNT. Hence, the CPU determines that not all the image data have been read out of the memory section 302. However, after the document has been fully read, $Y_{out}$ becomes equal to COUNT in a certain period of time. Then, the CPU turns the signal RFGENB to the read valid signal generating section 360 to a low level (step S35), determining that all the data have been read out of the memory section 302. This is the end of the RINT8 interrupt procedure. Thereafter, the CPU enters into the endless loop of the main routine, FIG. 24, and awaits an interruption. Every time the RINT interruption occurs, the CPU reads image data out of the memory section 30 while controlling the read address of the section 302 for reading the next eight lines of data.

Figure 28:
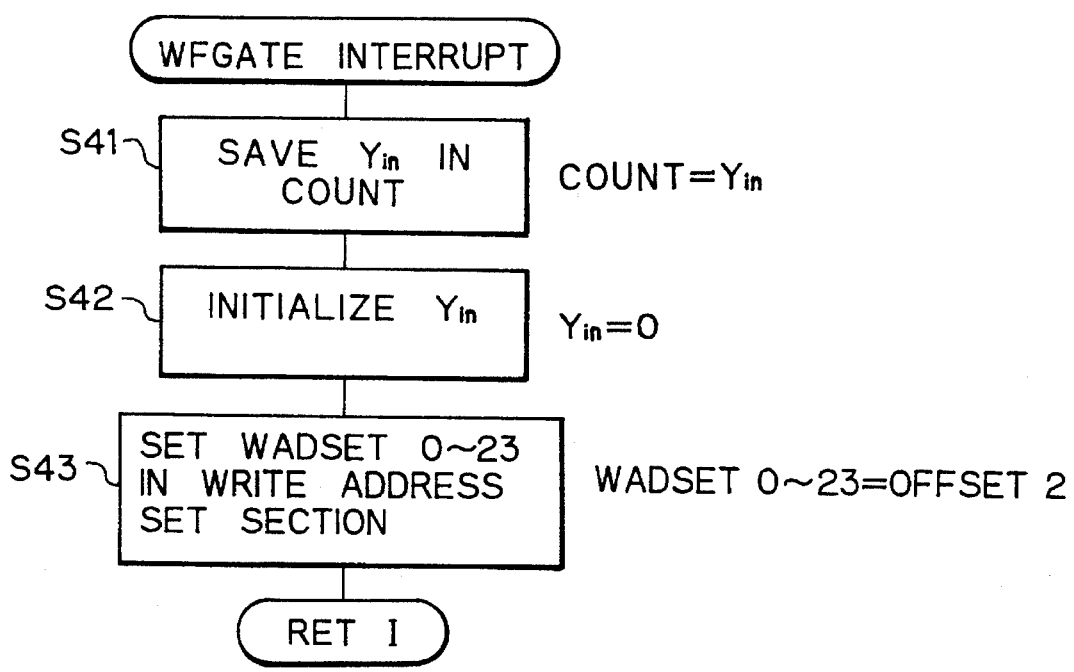
FIG. 28 is a flowchart representative of a WAGATE interrupt procedure to be executed by the memory control section.

FIG. 28 shows a WFGATE interrupt procedure. When the document is fully read, the read valid range signal WFGATE from the length detecting section 320 and associated with the subscanning direction goes low. Then, the WFGATE interrupt routine begins. First, the CPU saves the content of the write counter $Y_{in}$, which is indicative of the frequency of WINT8 interrupt processing executed, in the counter COUNT and uses it as a condition for ending the RINT8 interrupt routine shown in FIG. 27 (step 41). Subsequently, the CPU initializes the write counter $Y_{in}$ for the next document to be read (step S42), sets the initial value OFFSET2 (=WADSET 0–24 of the address for writing the next document data in the memory section 302 in the write address setting section 340 (step S43), and then ends the procedure.

Figure 29:
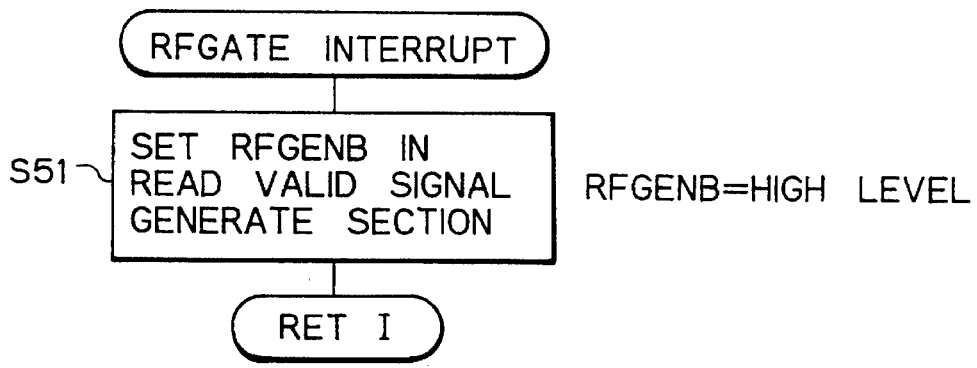
FIG. 29 is a flowchart representative of an RFGATE interrupt procedure to be executed by the memory control section.

FIG. 29 shows an RFGATE interrupt routine. Assume that all the image data have been read out of the memory section 303, and the signal RFGENB for the read valid signal generating section 360 has gone low in the RINT 8 interrupt routine. Then, the CPU executes the RFGATE interrupt routine by using the inverted signal of the signal RFGENB as an interrupt signal. Specifically, the CPU turns the signal RFGENB for the read valid signal generating section 360 to a high level (step S51). As a result, the image data read request signal DREQ from the printer 200 during repeat copy mode operation or after the next document read-out is made valid. Thereafter, the CPU ends the RFGATE interrupt procedure.

As stated above, when the scanner 100 reads a document, the write address generating section 330 generates addresses over the document width DATAWIDTH determined by the width detecting section 330. Hence, excessive white data are prevented from being written to the memory section 302, i.e., only the image data representative of the document are written to the memory section 302. Further, every time eight lines are scanned, the initial value of the write addresses is set in the address setting section 340, and then the setting is interrupted. This is repeated over the length of the document determined by the length determining section 320. As a result, only the image data representative of the document are written to the memory section 302.

Moreover, in the event of read-out, the read address generating section 390 generates addresses over the document width DATAWIDTH determined by the width detecting section 310, so that only the image data representative of the document can be read out of the memory section 302. In addition, after the read valid signal generating section 360 has generated a read valid signal and every time eight lines are read out, the initial value of the read addresses is set in the address setting section 380, and then the setting is interrupted. This is repeated over the length of the document determined by the length detecting section 320. As a result, only the image data representative of the document can be read out.

The white data adding section 400 adds white data, which have been removed at the time of write-in, to the image data read out. Hence, the image data read by the scanner 100 can be restored faithfully.

The embodiment, therefore, eliminates the occurrence that when the memory size and document size are different from each other, excessive data other than document data are written to a memory, obstructing the efficient use of a memory. This occurrence is particular to the conventional page memory system, as discussed previously. As a result, the embodiment enhances the efficient use of a memory and allows, for the same memory capacity, a greater amount of document data to be stored than the page memory system.

Various modifications will become possible for those skilled in the art after receiving the teachings of the present disclosure without departing from the scope thereof.

What is claimed is:

1. A digital image forming apparatus comprising:
   reading means for reading an image present on a document digitally;
   storing means for storing image data read by said reading means;
   width detecting means for determining a width of said document in a main scanning direction;
   read valid signal generating means for generating a read valid signal in response to an image data request signal from image forming means;
   read line counting means for counting, while said read valid signal is valid, lines sequentially read out of said storing means and outputting a count representing a number of lines counted;
   white data adding means for adding, on the basis of a count output from said read line counting means, white data to image data read out of said storing means;
   read address generating means for generating a read address of said storing means;
   read address setting means for setting an initial value of said read address in a main scanning direction for said read address generating means; and
   control means for calculating said initial value of said read address setting means on the basis of the width determined by said width detecting means.

2. An apparatus as claimed in claim 1, wherein said white data adding means adds white data on the basis of the width determined by said width detecting means.

3. An apparatus as claimed in claim 1, wherein said white data adding means masks, in response to said read valid signal, the subscanning direction of image data read out of said storing means.

4. An apparatus as claimed in claim 1, wherein said white data adding means masks, while said read valid signal is not valid, image data read out of said storing means and writes said image data in memory means to thereby clear said memory means or, while said read valid signal is valid, writes image data read out of said storing means by a different write address and a different read address in said memory means to thereby add white data.

5. A digital image forming apparatus comprising:
   reading means for reading an image present on a document digitally;
   storing means for storing image data read by said reading means;
   width determining means for determining a width of said document in a main scanning direction;
   document presence detecting means for detecting a presence of said document to produce a document presence signal while said document is being read from a leading edge thereof to a trailing edge thereof by said reading means in a subscanning direction;
   write line counting means for counting writing lines of said document while said document presence signal is being generated by said document presence detecting means and outputting a count representing a number of writing lines counted;
   write address generating means for generating a write address of said storing means on the basis of said count output from said write line counting means;
   write address setting means for setting an initial value of said write address in said subscanning direction for said write address generating means; and
   control means for calculating said initial value of said write address setting means on the basis of said width determined by said width determining means.

6. An apparatus as claimed in claim 5, wherein said control means calculates said write address of said write address generating means in said main scanning direction on the basis of said width determined by said width determining means, thereby making a width of image data to be stored in said storing means variable in said main scanning direction.

7. An apparatus as claimed in claim 5, wherein said control means stops said write address of said write address generating means in said main scanning direction on the basis of said width determined by said width determining means, thereby making a width of image data to be stored in said storing means variable in said main scanning direction.

* * * * *